(12) United States Patent
Kitakado et al.

(10) Patent No.: US 11,404,946 B2
(45) Date of Patent: Aug. 2, 2022

(54) METHOD FOR MANUFACTURING A STATOR

(71) Applicants: DENSO CORPORATION, Kariya (JP); TOYOTA JIDOSHA KABUSHIKI KAISHA, Toyota (JP)

(72) Inventors: Yasunori Kitakado, Kariya (JP); Kazuo Yoshikawa, Kariya (JP); Hiroaki Takeda, Kariya (JP); Junichi Shimoya, Kariya (JP); Kazushi Onda, Toyota (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/010,160

(22) Filed: Sep. 2, 2020

(65) Prior Publication Data

US 2021/0083560 A1   Mar. 18, 2021

(30) Foreign Application Priority Data

Sep. 13, 2019 (JP) .............................. JP2019-167506

(51) Int. Cl.
*H02K 15/00* (2006.01)
*H02K 15/085* (2006.01)
(Continued)

(52) U.S. Cl.
CPC ........... *H02K 15/085* (2013.01); *H02K 1/165* (2013.01); *H02K 3/12* (2013.01); *H02K 3/28* (2013.01);
(Continued)

(58) Field of Classification Search
CPC .. H02K 15/0087; H02K 3/12; H02K 15/0037; H02K 15/0031; H02K 15/0025;
(Continued)

(56) References Cited

U.S. PATENT DOCUMENTS 6,910,257 B1 * 6/2005 Gorohata ........... H02K 15/0428
242/599.1
10,355,567 B2 * 7/2019 Mizushima .............. H02K 3/28
(Continued)

FOREIGN PATENT DOCUMENTS

JP       2018-170910 A     11/2018

*Primary Examiner* — Thiem D Phan
(74) *Attorney, Agent, or Firm* — Oliff PLC

(57) ABSTRACT

An apparatus for manufacturing a stator includes a supporting member configured to support a stator core, at least one processing jig having a cylindrical part and a plurality of protruding parts, and an operating unit. The operating unit is configured to perform, in a state where each of coil protruding parts is inserted between one circumferentially-adjacent pair of the protruding parts of the processing jig and an axial end face of the stator core is located close to the protruding parts of the processing jig, a first operation and a second operation either simultaneously or alternately. The first operation is an operation of relatively rotating the stator core and the processing jig in a circumferential direction of the stator core. The second operation is an operation of relatively moving the stator core and the processing jig away from each other in an axial direction of the stator core.

1 Claim, 17 Drawing Sheets

(51) Int. Cl.
*H02K 15/04* (2006.01)
*H02K 15/02* (2006.01)
*H02K 1/16* (2006.01)
*H02K 3/50* (2006.01)
*H02K 3/28* (2006.01)
*H02K 3/12* (2006.01)
*H02K 15/06* (2006.01)

(52) U.S. Cl.
CPC ........... *H02K 3/50* (2013.01); *H02K 15/0087* (2013.01); *H02K 15/024* (2013.01); *H02K 15/0414* (2013.01); *H02K 15/064* (2013.01); *Y10T 29/49009* (2015.01)

(58) Field of Classification Search
CPC  H02K 15/0068; H02K 1/16; Y10T 29/49009; Y10T 29/53161; Y10T 29/49071; Y10T 29/49073; Y10T 29/53143
USPC .......................... 29/596, 597, 598, 605, 732
See application file for complete search history.

(56) References Cited

U.S. PATENT DOCUMENTS

| | | |
|---|---|---|
| 2017/0126106 A1 | 5/2017 | Mizushima et al. |
| 2019/0267879 A1 | 8/2019 | Mizushima et al. |

\* cited by examiner

SECOND CIRCUMFERENTIAL SIDE ⟵  ⟶ FIRST CIRCUMFERENTIAL SIDE

METHOD FOR MANUFACTURING A STATOR

CROSS-REFERENCE TO RELATED APPLICATION

This application is based on and claims priority from Japanese Patent Application No. 2019-167506 filed on Sep. 13, 2019, the contents of which are hereby incorporated by reference in their entirety into this application.

BACKGROUND

1 Technical Field

The present disclosure relates to apparatuses and methods for manufacturing stators for use in rotating electric machines.

2 Description of Related Art

There is known an apparatus for manufacturing a stator for use in a rotating electric machine. The stator includes an annular stator core having a plurality of slots formed therein and a stator coil formed of coil segments (or electrical conductor segments) inserted in the slots of the stator core. The manufacturing apparatus is configured to bend coil protruding parts in a circumferential direction of the stator core; the coil protruding parts are parts of the coil segments which protrude outside the slots from an axial end face of the stator core. Specifically, the manufacturing apparatus includes inner and outer bending dies each of which has a plurality of engaging claws formed therein. In manufacturing the stator, the inner bending die is placed to have its engaging claws respectively engaging with distal end portions of those coil protruding parts which are located on the radially inner side while the outer bending die is placed to have its engaging claws respectively engaging with distal end portions of those coil protruding parts which are located on the radially outer side. Then, the inner and outer bending dies are axially moved toward the stator core while being rotated respectively toward opposite sides in the circumferential direction of the stator core. Consequently, the radially inner coil protruding parts and the radially outer coil protruding parts are bent respectively toward opposite sides in the circumferential direction of the stator core. Thereafter, each radially-adjacent pair of the distal end portions of the coil protruding parts are joined, for example by welding, to form the stator coil.

SUMMARY

According to the present disclosure, there is provided an apparatus for manufacturing a stator for a rotating electric machine. The stator includes an annular stator core having a plurality of slots formed therein and a stator coil formed of a plurality of coil segments inserted in the slots of the stator core. The stator coil has a plurality of coil protruding parts which are parts of the coil segments protruding outside the slots from an axial end face of the stator core. The apparatus includes a supporting member, at least one processing jig and an operating unit. The supporting member is configured to support the stator core with the coil segments inserted in the slots of the stator core. The at least one processing jig is configured to be arranged coaxially with the stator core. The at least one processing jig has a cylindrical part to be arranged radially outside or radially inside the coil protruding parts and a plurality of protruding parts each radially protruding from the cylindrical part and arranged at predetermined intervals in a circumferential direction of the cylindrical part. The operating unit is configured to perform, in a state where each of the coil protruding parts is inserted between one circumferentially-adjacent pair of the protruding parts of the at least one processing jig and the axial end face of the stator core is located away from the protruding parts of the at least one processing jig in an axial direction of the stator core by a predetermined distance, a first operation and a second operation either simultaneously or alternately. The first operation is an operation of relatively rotating the stator core and the at least one processing jig in a circumferential direction of the stator core. The second operation is an operation of relatively moving the stator core and the at least one processing jig away from each other in the axial direction of the stator core.

According to the present disclosure, there is also provided a method of manufacturing a stator for a rotating electric machine. The stator includes an annular stator core having a plurality of slots formed therein and a stator coil formed of a plurality of coil segments inserted in the slots of the stator core. The stator coil has a plurality of coil protruding parts which are parts of the coil segments protruding outside the slots from an axial end face of the stator core. The method includes the steps of: supporting, by a supporting member, the stator core with the coil segments inserted in the slots of the stator core such that the coil protruding parts protrude in an axial direction of the stator core from the axial end face thereof; arranging at least one processing jig coaxially with the stator core, the at least one processing jig having a cylindrical part and a plurality of protruding parts each radially protruding from the cylindrical part and arranged at predetermined intervals in a circumferential direction of the cylindrical part; relatively moving the stator core and the at least one processing jig toward each other in the axial direction of the stator core to have (a) the cylindrical part of the at least one processing jig located radially outside or radially inside the coil protruding parts, (b) each of the coil protruding parts inserted between one circumferentially-adjacent pair of the protruding parts of the at least one processing jig, and (c) the axial end face of the stator core located away from the protruding parts of the at least one processing jig in the axial direction of the stator core by a predetermined distance; performing a first operation and a second operation either simultaneously or alternately, the first operation being an operation of relatively rotating the stator core and the at least one processing jig in a circumferential direction of the stator core, the second operation being an operation of relatively moving the stator core and the at least one processing jig away from each other in the axial direction of the stator core; and performing a third operation after the step of performing the first and second operations, the third operation being an operation of relatively moving the stator core and the at least one processing jig toward each other in the axial direction of the stator core with each of the protruding parts of the at least one processing jig kept in contact with a distal end portion of a corresponding one of the coil protruding parts or a portion of the corresponding coil protruding part which is immediately adjacent to the distal end portion.

DESCRIPTION OF EMBODIMENTS

Figure 1:
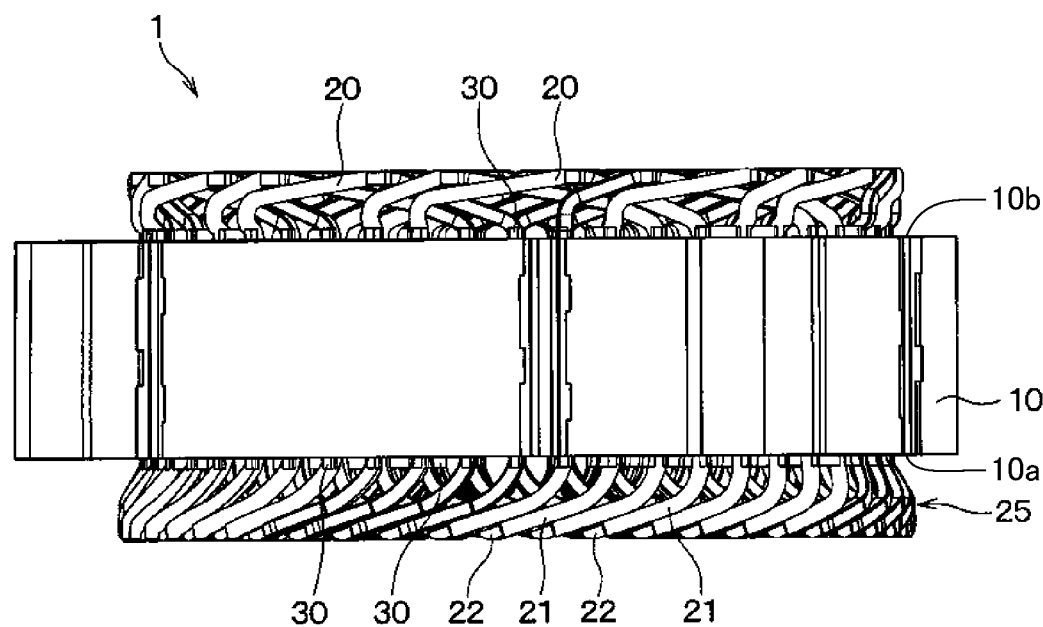
FIG. 1 is a side view of an intermediate product of a stator which is manufactured by a manufacturing apparatus and a manufacturing method according to a first embodiment.

The inventors of the present application have found, through investigation, that the above-described manufacturing method known in the art (see, for example, Japanese Patent Application Publication No. JP2018170910A) may involve the following problems.

That is, the known manufacturing apparatus is configured to bend the coil protruding parts by applying a load to the distal end portions of the coil protruding parts. Consequently, the radii of curvature of the coil protruding parts may become large. As a result, the height of a coil end of the stator coil and thus the axial dimension of the entire stator may be increased; the coil end is composed of the coil protruding parts.

Moreover, the known manufacturing apparatus is configured to be unable to control the radii of curvature of the coil protruding parts during the bending of the coil protruding parts in the circumferential direction of the stator core. Consequently, variation may occur in the radii of curvature of the coil protruding parts, making the positions of the distal end portions of the coil protruding parts unstable. As a result, it would become difficult to join each radially-adjacent pair of the distal end portions of the coil protruding parts in the subsequent joining step.

In contrast, with the configuration of the above-described manufacturing apparatus according to the present disclosure, the protruding parts of the at least one processing jig will apply a load to portions of the coil protruding parts which are located close to the stator core, thereby bending the coil protruding parts in the circumferential direction. Consequently, it becomes possible to reduce the radii of curvature of the coil protruding parts. As a result, it becomes possible to reduce the height of a coil end of the stator coil and thus the axial dimension of the entire stator; the coil end is composed of the coil protruding parts.

Moreover, with the configuration of the above-described manufacturing apparatus according to the present disclosure, the operating unit will perform the first and second operations either simultaneously or alternately, thereby making it possible to control the radii of curvature of the coil protruding parts. Consequently, it becomes possible to suppress variation in the radii of curvature of the coil protruding parts, thereby improving the positional accuracy of distal end portions of the coil protruding parts. As a result, it becomes possible to easily join each corresponding pair of the distal end portions of the coil protruding parts in a subsequent joining step.

Similarly, with the above-described manufacturing method according to the present disclosure, it becomes possible to reduce the height of the coil end of the stator coil and thus the axial dimension of the entire stator. Moreover, it also becomes possible to improve the positional accuracy of the distal end portions of the coil protruding parts, thereby making it possible to easily join each corresponding pair of the distal end portions of the coil protruding parts in a subsequent joining step.

Exemplary embodiments will be described hereinafter with reference to the drawings. It should be noted that for the sake of clarity and understanding, identical components having identical functions throughout the whole description have been marked, where possible, with the same reference numerals in the drawings and that for the sake of avoiding redundancy, descriptions of identical components will not be repeated.

First Embodiment

A stator 1, which is manufactured by a manufacturing apparatus and a manufacturing method according to the first embodiment, is for use in a rotating electric machine. The rotating electric machine includes the stator 1 and a rotor (not shown) that is rotatably arranged radially inside or radially outside the stator. In addition, the rotating electric machine may be configured as an electric motor, an electric generator or a motor-generator that selectively functions either as an electric motor or as an electric generator.

Figure 2:
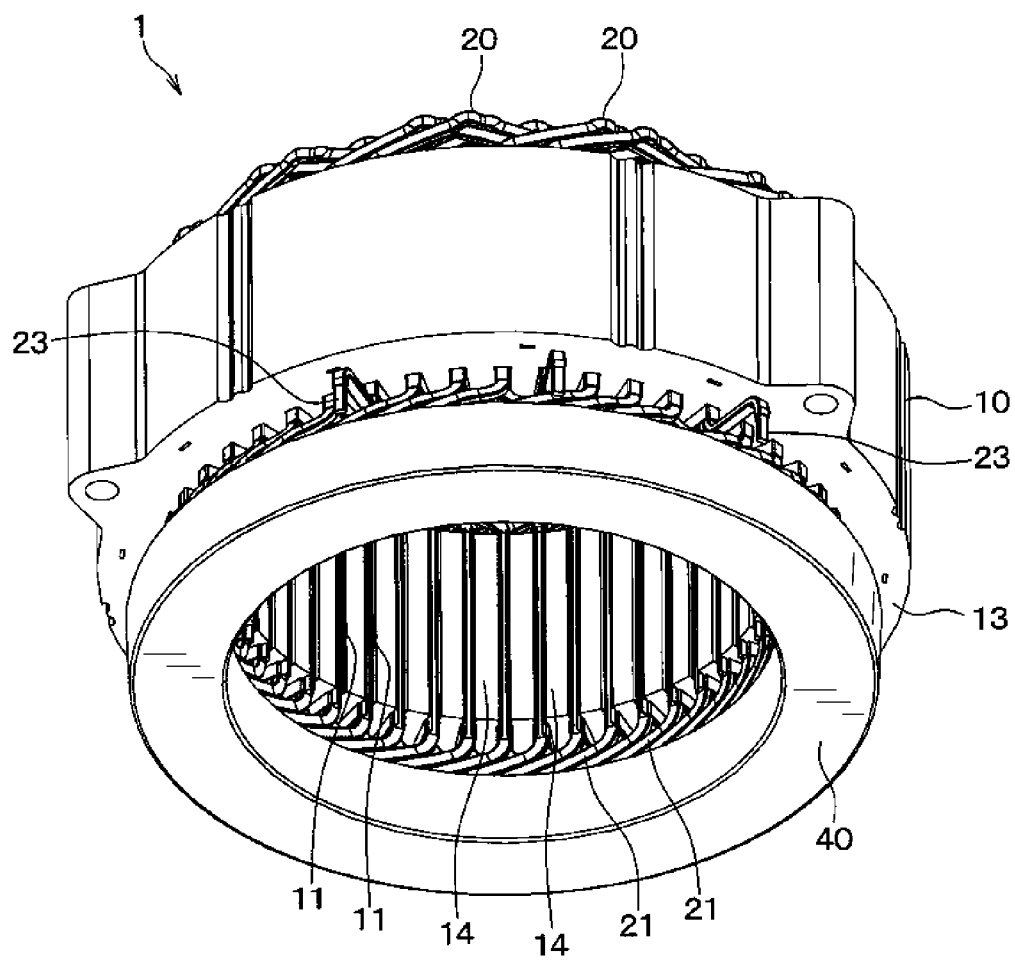
FIG. 2 is a perspective view of the stator manufactured by the manufacturing apparatus and the manufacturing method according to the first embodiment.
Figure 3:
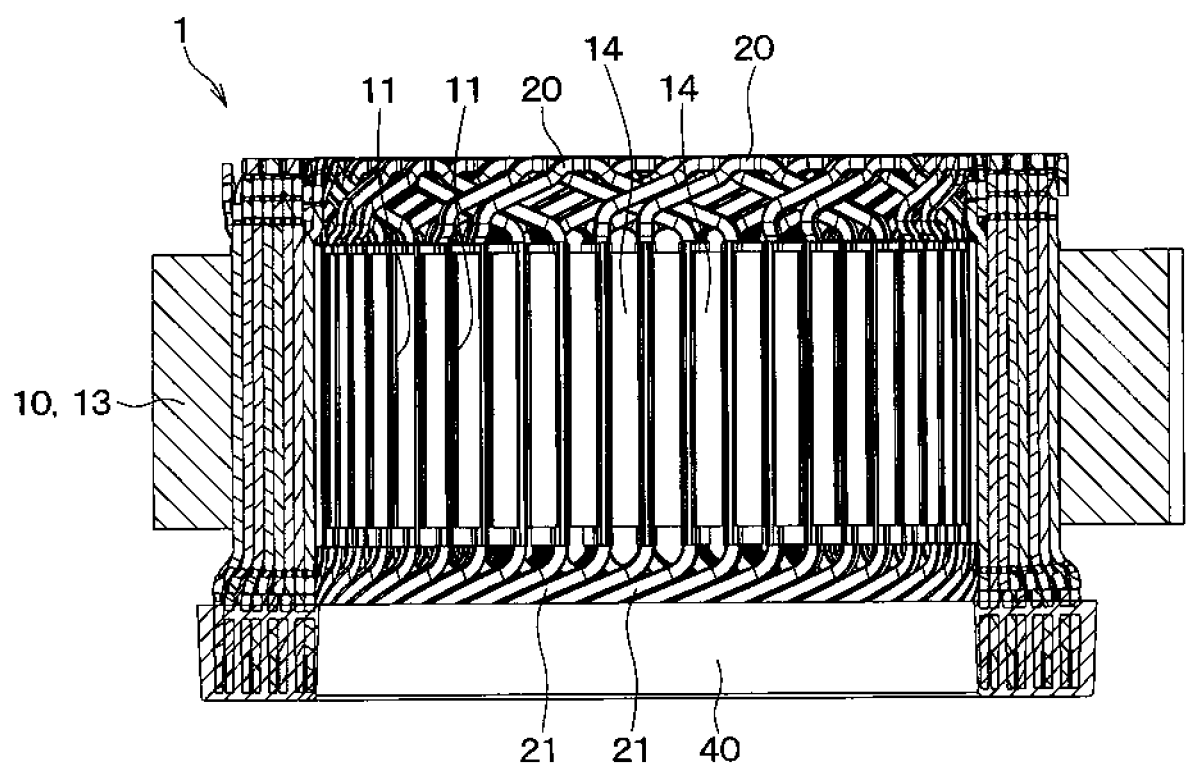
FIG. 3 is a cross-sectional view of the stator manufactured by the manufacturing apparatus and the manufacturing method according to the first embodiment.

FIG. 1 shows an intermediate product of the stator 1, while FIGS. 2 and 3 show the finally-obtained (or finished) stator 1.

As shown in FIGS. 1-3, the stator 1 includes an annular stator core 10 having a plurality of slots 11 formed therein, a stator coil formed of a plurality of coil segments (or electrical conductor segments) 20 inserted in the slots 11 of the stator core 10, and a plurality of insulators 30 inserted together with the coil segments 20 in the slots 11. It should be noted that only those parts of the insulators 30 which protrude outside the slots 11 of the stator core 10 are shown in FIG. 1.

The stator core 10 includes an annular back core 13, a plurality of teeth 14 that each extend radially inward from the back core 13 and are arranged at predetermined intervals in a circumferential direction of the stator core 10 (i.e., circumferential direction of the back core 13), and the slots 11 each of which is formed between one circumferentially-adjacent pair of the teeth 14. In addition, in the present embodiment, the stator core 10 is formed by laminating a plurality of annular magnetic steel sheets in an axial direction thereof.

Each of the coil segments 20 is substantially U-shaped to have a pair of straight portions extending parallel to each other and a turn portion connecting ends of the straight portions on the same side. The straight portions are respectively inserted in two corresponding slots 11 of the stator core 10 such that parts of the straight portions axially protrude outside the corresponding slots 11 from a first axial end face 10a (i.e., the lower end face in FIGS. 1-3) of the stator core 10. That is, each of the coil segments 20 has a pair of protruding parts 21 that axially protrude outside the corresponding slots 11 from the first axial end face 10a of the stator core 10. The protruding parts 21 are then bent in the circumferential direction of the stator core 10 so as to extend obliquely with respect to the first axial end face 10a of the stator core 10. Hereinafter, the protruding parts 21 of the coil segments 20 will be simply referred to as coil protruding parts 21. All the coil protruding parts 21 together constitute a coil end 25 of the stator coil.

In addition, each of the coil segments 20 has its turn portion protruding outside the corresponding slots 11 from a second axial end face 10b (i.e., the upper end face in FIGS. 1-3) of the stator core 10. All the turn portions of the coil segments 20 together constitute another coil end of the stator coil.

In the present embodiment, the coil segments 20 are obtained by cutting and plastically deforming an electric wire that includes an electrical conductor and an insulating coat. The electrical conductor is formed of an electrically conductive material (e.g., copper) and has a substantially rectangular cross-sectional shape. The insulating coat is formed of an electrically insulative material (e.g., enamel) and provided to cover the outer surface of the electrical conductor.

Moreover, as shown in FIG. 1, the insulating coat is removed from distal end portions 22 of the coil protruding parts 21. Consequently, the distal end portions 22 of the coil protruding parts 21 constitute exposed portions 22 where the electrical conductor is exposed from the insulating coat.

Furthermore, each radially-adjacent pair of the distal end portions (i.e., exposed portions) 22 of the coil protruding parts 21 are joined, for example by welding, to form a joint (e.g., weld) therebetween. Consequently, all the coil segments 20 are electrically connected together to form the stator coil which is a three-phase coil either Y-connected or Δ-connected. In addition, the joints formed between the distal end portions 22 of the coil protruding parts 21 will be simply referred to as coil joints hereinafter.

As shown in FIGS. 2 and 3, in the finally-obtained stator 1, the coil joints and those portions of the coil protruding parts 21 which are immediately adjacent to the coil joints are encapsulated by an encapsulating insulator 40. The encapsulating insulator 40 is formed of, for example, a thermosetting resin.

Next, the apparatus for manufacturing the stator 1 according to the present embodiment will be described with reference to FIGS. 4-6.

The manufacturing apparatus is designed to be used in a bending step of the method of manufacturing the stator 1 according to the present embodiment. As will be described in detail later, in the bending step, the coil protruding parts 21, which axially protrude outside the slots 11 from the first axial end face 10a of the stator core 10, are bent in the circumferential direction of the stator core 10 so as to extend obliquely with respect to the first axial end face 10a (see FIGS. 1 and 11).

Figure 4:
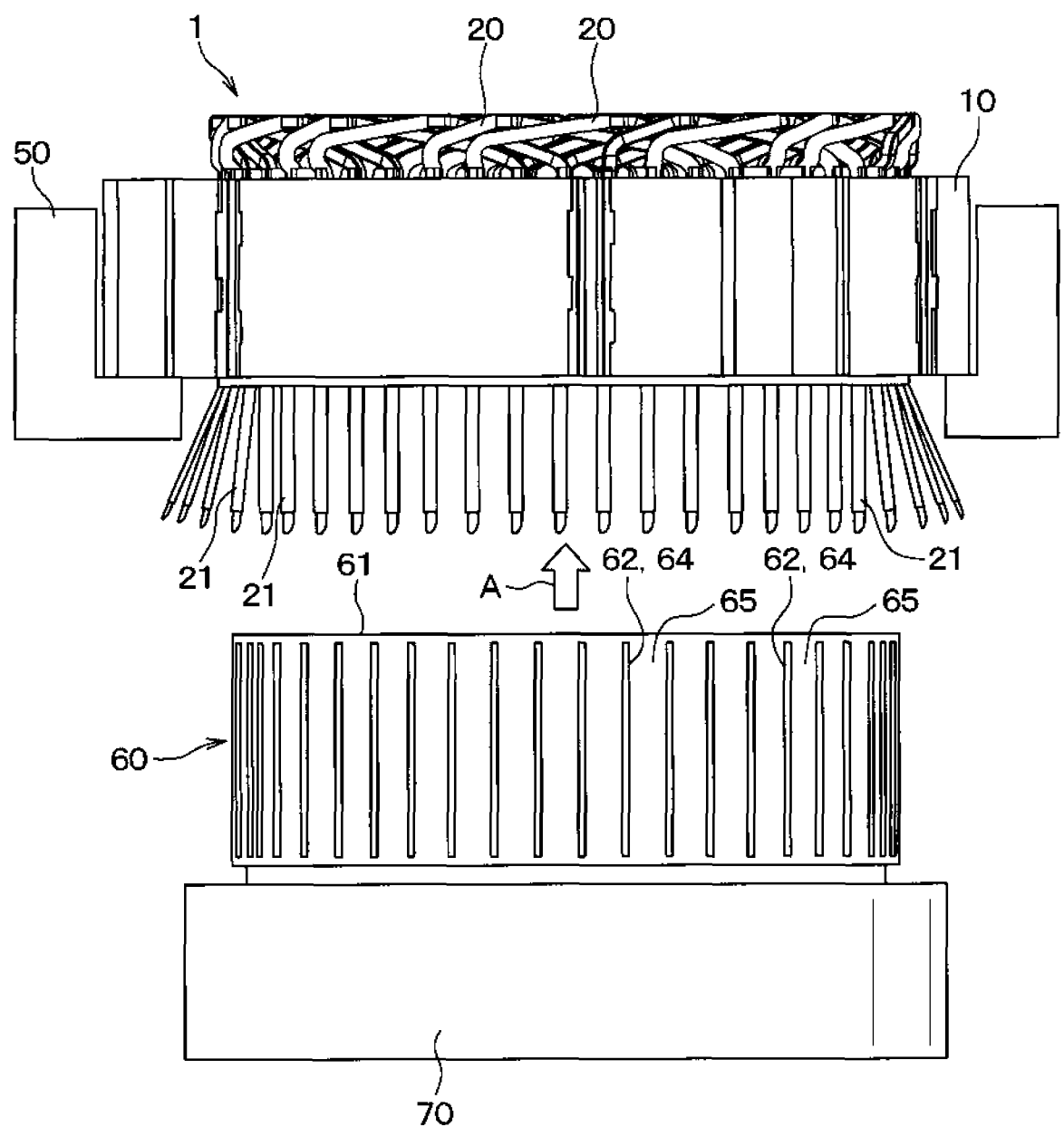
FIG. 4 is a configuration diagram of the manufacturing apparatus according to the first embodiment.
Figure 5:
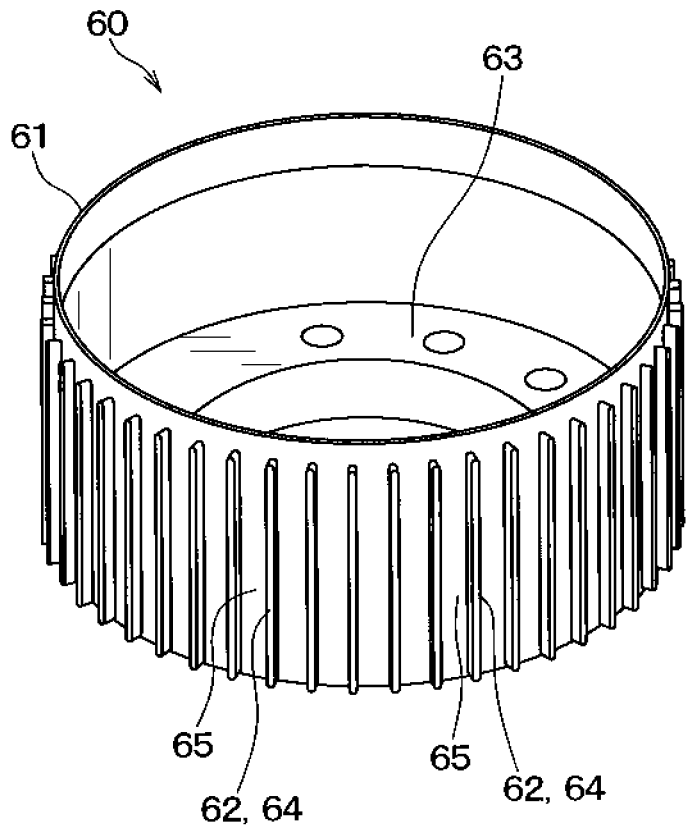
FIG. 5 is a perspective view of a processing jig of the manufacturing apparatus according to the first embodiment.
Figure 6:
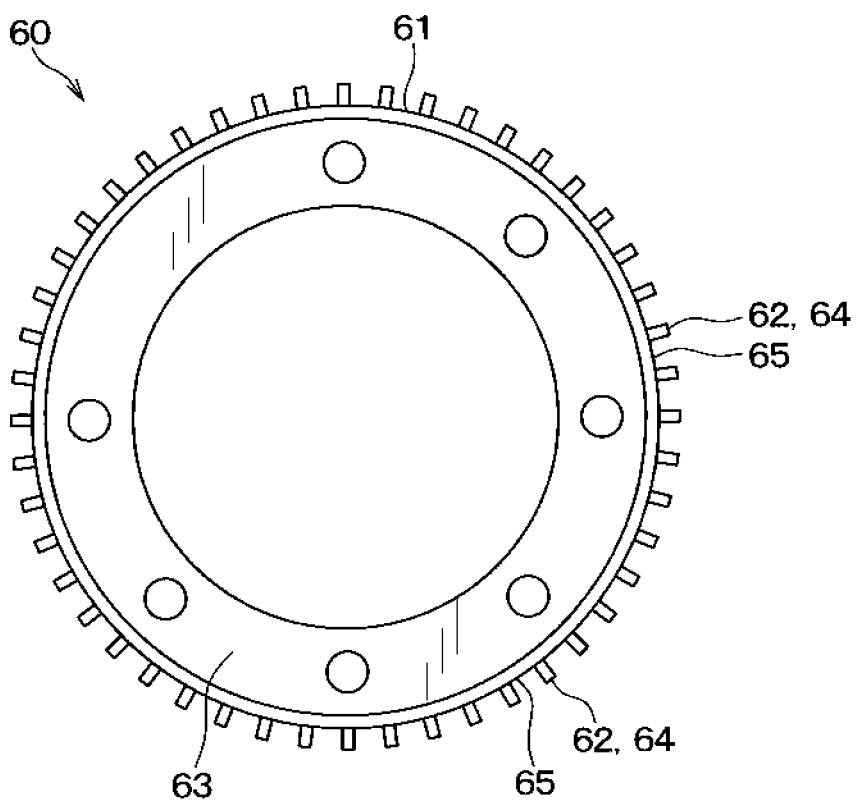
FIG. 6 is a plan view of the processing jig of the manufacturing apparatus according to the first embodiment.

As shown in FIGS. 4-6, the manufacturing apparatus includes a supporting member 50, a plurality of processing jigs 60 and an operating unit 70. It should be noted that for the sake of simplicity, there is shown only one of the processing jigs 60 in FIGS. 4-6.

The supporting member 50 is configured to support the stator core 10 having the coil segments 20 inserted in the slots 11 thereof. The coil protruding parts 21, which axially protrude outside the slots 11 of the stator core 10 supported by the supporting member 50, are arranged in alignment with each other in the circumferential direction of the stator core 10.

Moreover, though not shown in FIG. 4, the straight portions of the substantially U-shaped coil segments 20 are radially arranged in a plurality of layers in the slots 11 of the stator core 10. Accordingly, the coil protruding parts 21, which axially protrude outside the slots 11 of the stator core 10, are also radially arranged in a plurality of layers.

Each of the processing jigs 60 has a cylindrical part 61, a plurality of protruding parts 62 each radially protruding from the cylindrical part 61, and a base part 63 provided radially inside the cylindrical part 61. In the bending step, each of the processing jigs 60 is arranged coaxially with the stator core 10.

The inner or outer diameter of the cylindrical part 61 is set according to the diameter of an incircle or a circumcircle of the coil protruding parts 21. Since the coil protruding parts 21 are radially arranged in the plurality of layers, the processing jigs 60 are configured to have the inner or outer diameters of the respective cylindrical parts 61 set to be different from each other.

Moreover, of the plurality of processing jigs 60, a radially innermost processing jig 60 is configured such that its cylindrical part 61 can be arranged radially inside all the coil protruding parts 21. In contrast, a radially outermost processing jig 60 is configured such that its cylindrical part 61 can be arranged radially outside all the coil protruding parts 21. Moreover, each of the remaining (or radially intermediate) processing jigs 60 is configured such that its cylindrical part 61 can be arranged between one radially-adjacent pair of the layers of the coil protruding parts 21.

In addition, each of the processing jigs 60 may be configured to have all the protruding parts 62 thereof protruding either radially outward or radially inward from the cylindrical part 61. For example, the processing jig 60 shown in FIGS. 4-6 is configured to have all the protruding parts 62 protruding radially outward from the cylindrical part 61. However, the processing jig 60 may alternatively be configured to have all the protruding parts 62 protruding radially inward from the cylindrical part 61.

In the present embodiment, each of the processing jigs 60 has its protruding parts 62 formed as axially-extending walls 64 that each extend in the axial direction of the cylindrical part 61 and are arranged at predetermined intervals in the circumferential direction of the cylindrical part 61 (or the circumferential direction of the stator core 10). Between each circumferentially-adjacent pair of the axially-extending walls 64 (i.e., the protruding parts 62), there is formed a groove 65. The circumferential width of each of the grooves 65 formed between the axially-extending walls 64 is set to be larger than the circumferential width of each of the coil protruding parts 21. Therefore, it is possible for each of the grooves 65 to have a corresponding one of the coil protruding parts 21 inserted therein. More specifically, with movement of the processing jig 60 in the axial direction indicated by an arrow A in FIG. 4, the corresponding coil protruding parts 21 are inserted respectively into the grooves 65 formed between the axially-extending walls 64. In addition, during the insertion, the circumferential side surfaces (i.e., the side surfaces facing in the circumferential direction) of the axially-extending walls 64 can make contact with the circumferential side surfaces of the corresponding coil protruding parts 21.

Moreover, in each of the processing jigs 60, the base part 63 is located radially inside the cylindrical part 61 and fixed to one axial end (i.e., the lower end in FIGS. 4 and 5) of the cylindrical part 61. Further, the base part 63 is mechanically connected to the operating unit 70.

The operating unit 70 is configured to be capable of moving the processing jigs 60 in both the circumferential and axial directions of the stator core 10. It should be noted that the operating unit 70 may alternatively be configured to be capable of moving the stator core 10, which is supported by the supporting member 50, in both the circumferential and axial directions of the stator core 10 instead of, or as well as, moving the processing jigs 60.

Hereinafter, the operation of the operating unit 70 for relatively rotating the stator core 10 and the processing jigs 60 in the circumferential direction of the stator core 10 will be referred to as the first operation; and the operation of the operating unit 70 for relatively moving the stator core 10 and the processing jigs 60 away from each other in the axial direction of the stator core 10 will be referred to as the second operation. Moreover, the operation of the operating unit 70 for relatively moving the stator core 10 and the processing jigs 60 toward each other in the axial direction of the stator core 10 will be referred to as the third operation. The first, second and third operations performed by the operating unit 70 will be described in detail later.

Next, the method of manufacturing the stator 1 according to the present embodiment will be described with reference to FIGS. 7-13.

Figure 7:
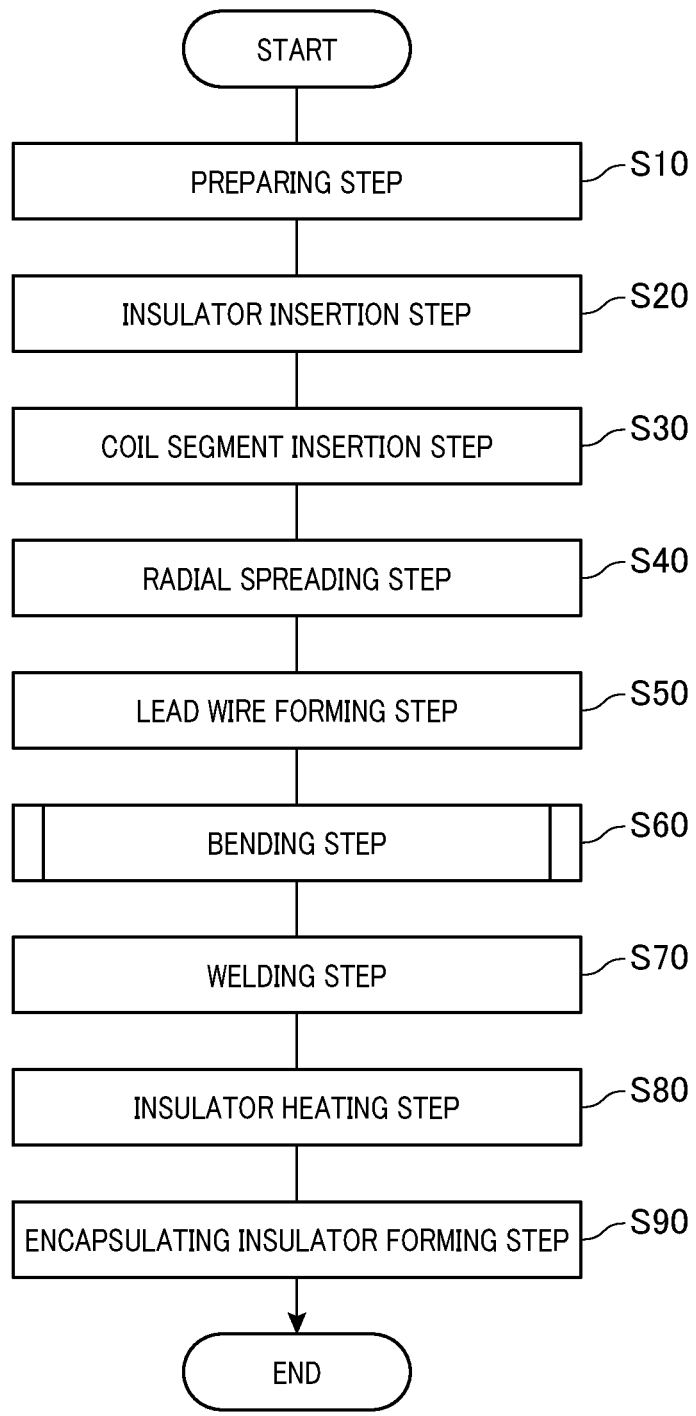
FIG. 7 is a flowchart illustrating the manufacturing method according to the first embodiment.

FIG. 7 is a flowchart illustrating the outline of the manufacturing method according to the present embodiment.

As shown in FIG. 7, the manufacturing method includes a preparing step S10, an insulator insertion step S20, a coil segment insertion step S30, a radial spreading step S40, a lead wire forming step S50, the bending step S60, a welding step S70, an insulator heating step S80 and an encapsulating insulator forming step S90.

First, in the preparing step S10, the stator core 10, the coil segments 20 for forming the stator coil, and the insulators 30 are prepared.

In the insulator insertion step S20, the insulators 30 are respectively inserted into the corresponding slots 11 of the stator core 10. Consequently, the insulators 30 are respectively located inside the interior walls of the stator core 10 defining the corresponding slots 11. In addition, in the present embodiment, the insulators 30 are formed of, for example, a curable and foamable resin that is foamed and cured upon being heated.

In the coil segment insertion step S30, the coil segments 20 are inserted into the corresponding slots 11 of the stator core 10. Consequently, in each of the slots 11 of the stator core 10, between the interior wall of the stator core 10 defining the slot 11 and the corresponding coil segments 20 inserted in the slot 11, there is interposed the corresponding insulator 30 inserted in the slot 11.

More specifically, in this step, for each of the substantially U-shaped coil segments 20, the two straight portions of the coil segment 20 are respectively inserted into two corresponding slots 11 of the stator core 10 which are located away from each other by one magnetic pole pitch. Consequently, parts of the straight portions axially protrude outside the corresponding slots 11 from the first axial end face 10a (i.e., the lower end face in FIGS. 1-3) of the stator core 10. Each of the protruding parts of the straight portions constitutes one of the coil protruding parts 21. In addition, in each of the slots 11 of the stator core 10, the straight portions of the coil segments 20 are arranged in radial alignment with each other. Accordingly, for each of the slots 11 of the stator core 10, those coil protruding parts 21 which protrude outside from the slot 11 are also arranged in radial alignment with each other.

Figure 8:
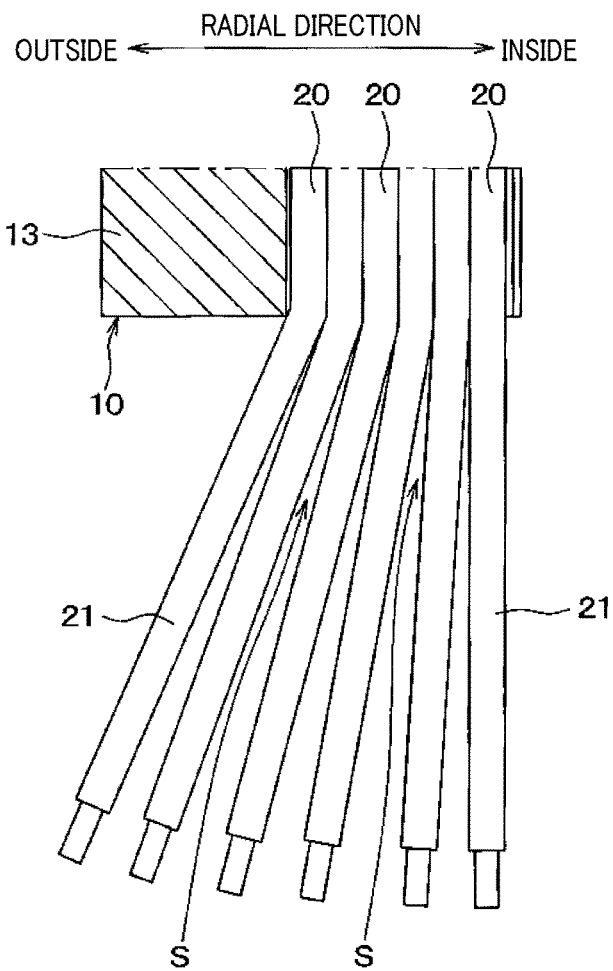
FIG. 8 is a partially cross-sectional view showing coil protruding parts after being deformed to radially spread in a radial spreading step of the manufacturing method according to the first embodiment.

In the radial spreading step S40, the coil protruding parts 21 are deformed to radially spread. Consequently, as shown in FIG. 8, between each radially-adjacent pair of the coil protruding parts 21, there is formed a predetermined gap S.

In the lead wire forming step S50, lead wires 23 (shown in FIG. 2) of the three-phase stator coil are formed into predetermined shapes. More specifically, each of the lead wires 23 is formed by plastically deforming a given one of the coil protruding parts 21. Moreover, the lead wires 23 are formed at predetermined positions where they can be respectively connected to ends of power lines (not shown) through which three-phase AC power is supplied to the stator coil.

In the bending step S60, the coil protruding parts 21 are bent in the circumferential direction of the stator core 10 so as to extend obliquely with respect to the first axial end face 10a of the stator core 10.

The bending step S60 will be described in detail hereinafter with reference to FIGS. 9-13.

Figure 9:
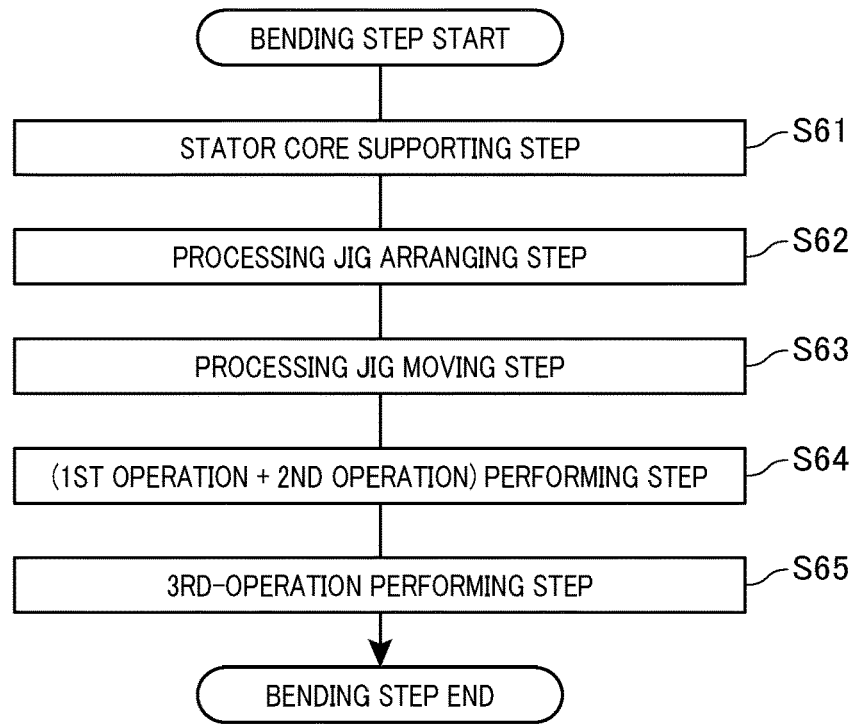
FIG. 9 is a flowchart illustrating a bending step of the manufacturing method according to the first embodiment.

FIG. 9 is a flowchart illustrating the outline of the bending step S60. FIGS. 10-13 are schematic views along a radial direction of the stator core 10, showing only three circumferentially-adjacent coil protruding parts 21 among all the coil protruding parts 21 and part of one of the processing jigs 60 corresponding to the three coil protruding parts 21. In addition, in the present embodiment, in the bending step S60, each of the processing jigs 60 is moved relative to the stator core 10 by the operating unit 70.

As shown in FIG. 9, the bending step S60 includes a stator core supporting step S61, a processing jig arranging step S62, a processing jig moving step S63, a first-and-second-operations performing step S64, and a third-operation performing step S65.

In the stator core supporting step S61, the stator core 10 is supported by the supporting member 50 (see FIG. 4).

In the processing jig arranging step S62, each of the processing jigs 60 is arranged coaxially with the stator core 10.

Figure 10:
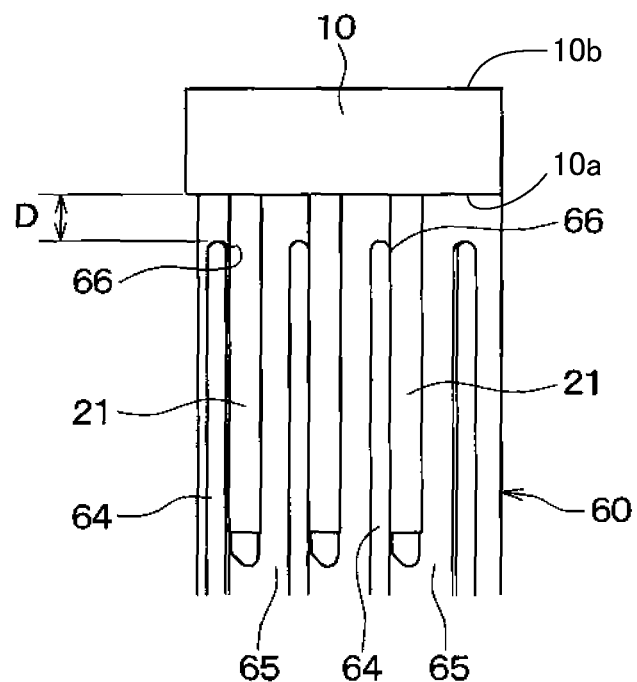
FIG. 10 is a first explanatory diagram illustrating the bending step of the manufacturing method according to the first embodiment.

In the processing jig moving step S63, each of the processing jigs 60 is axially moved toward the stator core 10, as indicated with the arrow A in FIG. 4, causing the first axial end face 10a of the stator core 10 and a stator core-side axial end of the processing jig 60 to become closer to each other (see FIG. 10). Consequently, for each of the processing jigs 60, the cylindrical part 61 of the processing jig 60 is located radially outside all the coil protruding parts 21, radially inside all the coil protruding parts 21, or between two radially-adjacent layers of the coil protruding parts 21. Moreover, as shown in FIG. 10, in each of the grooves 65 formed between the axially-extending walls 64 of the processing jigs 60, there is inserted a corresponding one of the coil protruding parts 21. In this state, as shown in FIG. 10, stator core-side ends 66 of the axially-extending walls 64 of the processing jigs 60 are located away from the first axial end face 10a of the stator core 10 by a predetermined distance D. The distance D is predetermined so as to allow the coil protruding parts 21 to be bent between the axially-extending walls 64 of the processing jigs 60. Therefore, upon the first operation being performed by the operating unit 70 to rotate the processing jigs 60 in the circumferential direction of the stator core 10, each of the coil protruding parts 21 will be bent with the bending start point being located between the first axial end face 10a of the stator core 10 and the location where the coil protruding part 21 abuts the stator core-side end 66 of a corresponding one of the axially-extending walls 64 of the processing jigs 60. Consequently, with the above configuration of the processing jigs 60 according to the present embodiment, it becomes possible to set the bending start point of each of the coil protruding parts 21 to be in the vicinity of the stator core 10.

Figure 11:
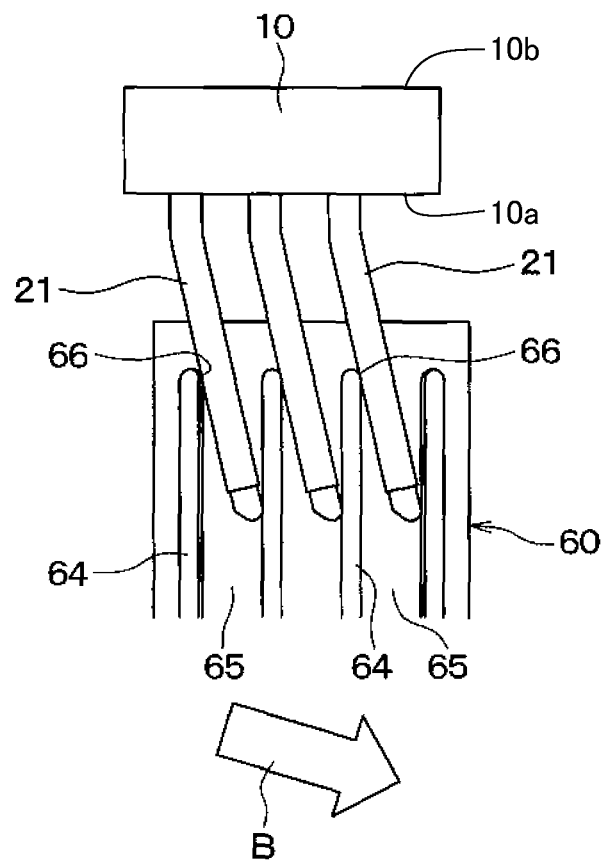
FIG. 11 is a second explanatory diagram illustrating the bending step of the manufacturing method according to the first embodiment.
Figure 12:
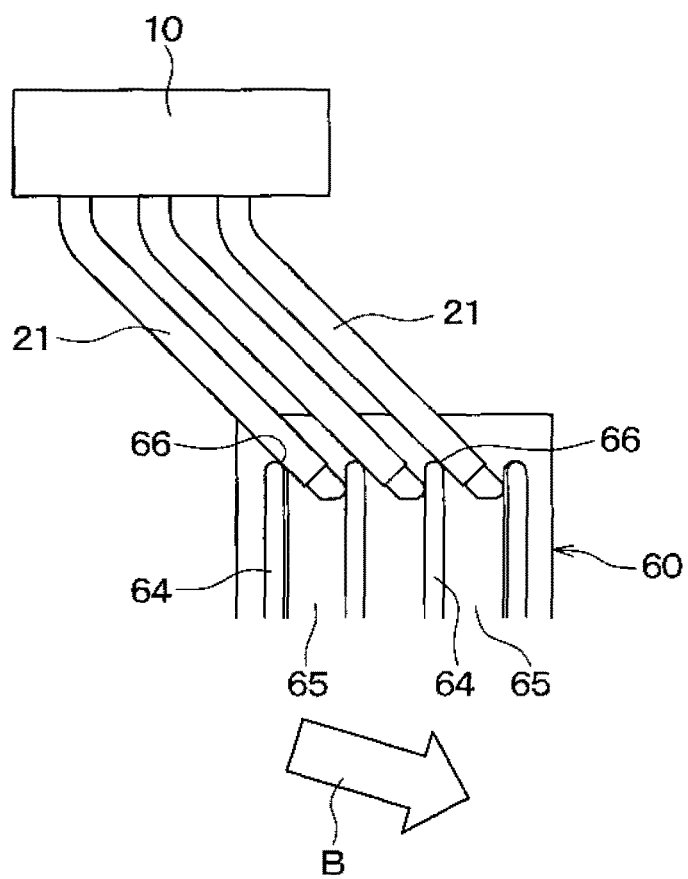
FIG. 12 is a third explanatory diagram illustrating the bending step of the manufacturing method according to the first embodiment.

In the first-and-second-operations performing step S64, as shown in FIGS. 11 and 12, the operating unit 70 performs, either simultaneously or alternately, the first operation of rotating the processing jigs 60 in the circumferential direction of the stator core 10 and the second operation of axially moving the processing jigs 60 away from the stator core 10. The first and second operations are set according to the circumferential width of each of the grooves 65 formed in the processing jigs 60. More specifically, the operating unit 70 axially moves the processing jigs 60 away from the stator core 10 while rotating the processing jigs 60 in the circumferential direction of the stator core 10 so as to prevent the distal end portions 22 of the coil protruding parts 21 from making contact with those axially-extending walls 64 of the processing jigs 60 which are located forward of the respective coil protruding parts 21 in the rotational direction. In addition, in FIGS. 11 and 12, the direction of movement of the processing jigs 60 relative to the stator core 10 during the first and second operations is indicated by an arrow B.

With the first and second operations performed by the operating unit 70, it becomes possible to bend the coil protruding parts 21 in the circumferential direction of the stator core 10 while controlling the radii of curvature of the coil protruding parts 21. Consequently, it becomes possible to suppress variation in the radii of curvature of the coil protruding parts 21.

Figure 13:
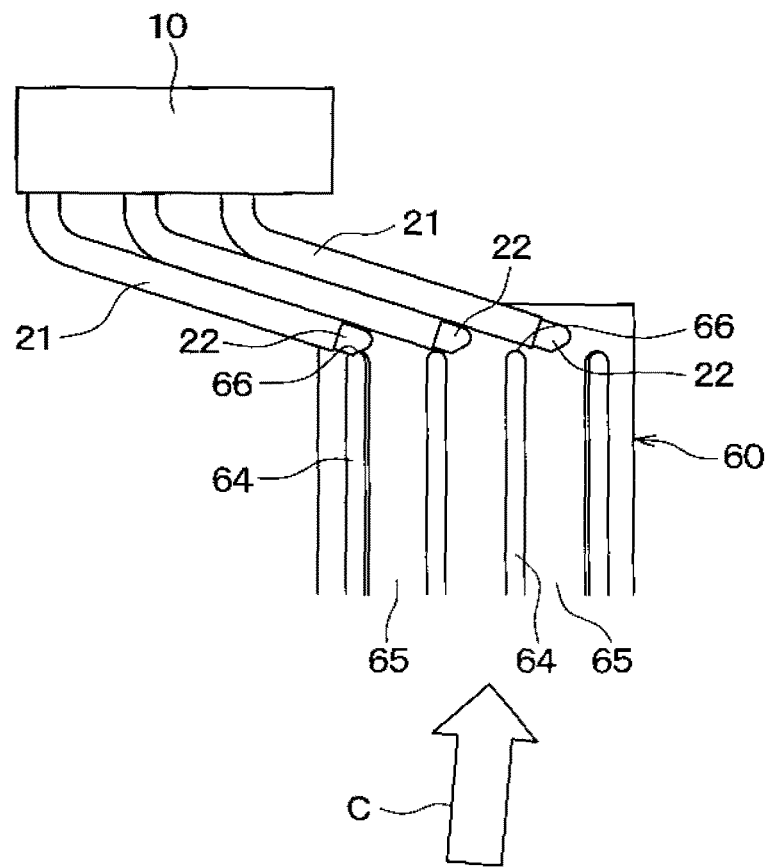
FIG. 13 is a fourth explanatory diagram illustrating the bending step of the manufacturing method according to the first embodiment.

In the third-operation performing step S65, as shown in FIG. 13, after performing the first and second operations until the coil protruding parts 21 are withdrawn from the grooves 65 formed in the processing jigs 60, the operating unit 70 further performs the third operation of axially moving the processing jigs 60 toward the stator core 10 with the stator core-side ends 66 of the axially-extending walls 64 of the processing jigs 60 kept in contact with the distal end portions 22 of the corresponding coil protruding parts 21 or those portions of the corresponding coil protruding parts 21 which are immediately adjacent to the distal end portions 22. Consequently, the coil protruding parts 21 are pressed and thus bent toward the stator core 10 by the stator core-side ends 66 of the corresponding axially-extending walls 64 of the processing jigs 60. As a result, the radii of curvature of the coil protruding parts 21 are further reduced, thereby further reducing the height of the coil end 25 of the stator coil. In addition, in FIG. 13, the direction of movement of the processing jigs 60 relative to the stator core 10 during the third operation is indicated by an arrow C.

Upon all of the above-described steps S61-S65 having been performed, the bending step S60 terminates. As a result, the intermediate product of the stator 1 as shown in FIG. 1 is obtained. In the intermediate product, each of the coil protruding parts 21 has its distal end portion 22 located radially adjacent to or radially abutting the distal end portion 22 of another of the coil protruding parts 21. Since the height of the coil end 25 is reduced and variation in the radii of curvature of the coil protruding parts 21 is suppressed in the above-described bending step S60, the positional accuracy of the distal end portions 22 of the coil protruding parts 21 is improved. Consequently, it becomes possible to easily weld each corresponding pair of the distal end portions 22 of the coil protruding parts 21 in the subsequent welding step S70.

Referring back to FIG. 7, in the welding step S70, each radially-adjacent or radially-abutting pair of the distal end portions (i.e., exposed portions) 22 of the coil protruding parts 21 are welded to form a weld (or joint) therebetween. Consequently, all the coil segments 20 are electrically connected together to form the three-phase stator coil.

In the insulator heating step S80, the insulators 30 are heated by at least one of induction heating and energization heating. As described above, in the present embodiment, the insulators 30 are formed of the curable and foamable resin. Therefore, upon being heated in this step, the insulators 30 are foamed and cured. Consequently, the vacant spaces in the slots 11 of the stator core 10 are filled with the insulators 30, thereby fixing the coil segments 20 in the slots 11.

In the encapsulating insulator forming step, the coil joints and those portions of the coil protruding parts 21 which are immediately adjacent to the coil joints are encapsulated by the encapsulating insulator 40. Specifically, in this step, the coil joints and those portions of the coil protruding parts 21 which are immediately adjacent to the coil joints are placed in a recess formed in a die (not shown). Then, a liquid thermosetting resin for forming the encapsulating insulator 40 is injected into the recess of the die. Thereafter, the liquid thermosetting resin is heated by at least one of induction heating and energization heating. Consequently, the liquid thermosetting resin is cured to form the encapsulating insulator 40. Then, the stator 1 is removed from the die.

As a result, the stator 1 as shown in FIGS. 2 and 3 is finally obtained.

According to the present embodiment, it is possible to achieve the following advantageous effects.

The apparatus for manufacturing the stator 1 according to the present embodiment includes the supporting member 50 configured to support the stator core 10, the processing jigs 60 each having the cylindrical part 61 and the protruding parts 62, and the operating unit 70 configured to perform the first and second operations either simultaneously or alternately.

With the above configuration of the manufacturing apparatus according to the present embodiment, the protruding parts 62 of the processing jigs 60 will apply a load to portions of the coil protruding parts 21 which are located close to the stator core 10, thereby bending the coil protruding parts 21 in the circumferential direction of the stator core 10. Consequently, it becomes possible to reduce the radii of curvature of the coil protruding parts 21. As a result, it becomes possible to reduce the height of the coil end 25 of the stator coil and thus the axial dimension of the entire stator 1.

Moreover, with the above configuration of the manufacturing apparatus according to the present embodiment, the operating unit 70 will perform the first and second operations either simultaneously or alternately, thereby making it possible to control the radii of curvature of the coil protruding parts 21. Consequently, it becomes possible to suppress variation in the radii of curvature of the coil protruding parts 21, thereby improving the positional accuracy of the distal end portions 22 of the coil protruding parts 21. As a result, it becomes possible to easily weld each corresponding pair of the distal end portions 22 of the coil protruding parts 21 in the subsequent welding step S70.

In the manufacturing apparatus according to the present embodiment, the operating unit 70 is configured to perform the first and second operations either simultaneously or alternately according to the predetermined intervals between the protruding parts 62 of the processing jigs 60 in the circumferential direction (i.e., the circumferential width of each of the grooves 65). Consequently, it becomes possible to bend the coil protruding parts 21 in the circumferential direction of the stator core 10 while controlling the radii of curvature of the coil protruding parts 21. As a result, it becomes possible to suppress variation in the radii of curvature of the coil protruding parts 21.

In the manufacturing apparatus according to the present embodiment, the operating unit 70 is configured to perform the third operation after performing the first and second operations. The third operation is an operation of axially moving the processing jigs 60 toward the stator core 10 with the stator core-side ends 66 of the axially-extending walls 64 of the processing jigs 60 kept in contact with the distal end portions 22 of the corresponding coil protruding parts 21 or those portions of the corresponding coil protruding parts 21 which are immediately adjacent to the distal end portions 22. Consequently, by performing the third operation, it becomes possible to further reduce the radii of curvature of the coil protruding parts 21 and thus the height of the coil end 25 of the stator coil.

In the manufacturing apparatus according to the present embodiment, each of the processing jigs 60 has its protruding parts 62 formed as the axially-extending walls 64 that each extend in the axial direction of the cylindrical part 61 and are arranged at the predetermined intervals in the circumferential direction of the cylindrical part 61. Moreover, the processing jigs 60 are configured to allow the coil protruding parts 21 to be respectively inserted in the grooves 65 formed between the axially-extending walls 64 of the processing jigs 60.

With the protruding parts 62 of the processing jigs 60 formed as the axially-extending walls 64, it becomes possible to prevent the coil protruding parts 21 from being excessively bent during the first operation.

In the bending step S60 of the manufacturing method according to the present embodiment, each of the processing jigs 60 is arranged to have its cylindrical part 61 located radially outside or radially inside the coil protruding parts 21. Then, the first and second operations are performed either simultaneously or alternately. Thereafter, the third operation is performed to axially move the processing jigs 60 toward the stator core 10 with the protruding parts 62 of the processing jigs 60 kept in contact with the distal end portions 22 of the corresponding coil protruding parts 21 or those portions of the corresponding coil protruding parts 21 which are immediately adjacent to the distal end portions 22.

With the above manufacturing method according to the present embodiment, it becomes possible to reduce the height of the coil end 25 of the stator coil and thus the axial dimension of the entire stator 1. Moreover, it also becomes possible to improve the positional accuracy of the distal end portions 22 of the coil protruding parts 21, thereby making it possible to easily weld each corresponding pair of the distal end portions 22 of the coil protruding parts 21 in the subsequent welding step S70.

Second Embodiment

In the above-described first embodiment, each of the processing jigs 60 has its protruding parts 62 formed as the axially-extending walls 64 that each extend in the axial direction of the cylindrical part 61 and are arranged at predetermined intervals in the circumferential direction of the cylindrical part 61 (see FIG. 5).

Figure 14:
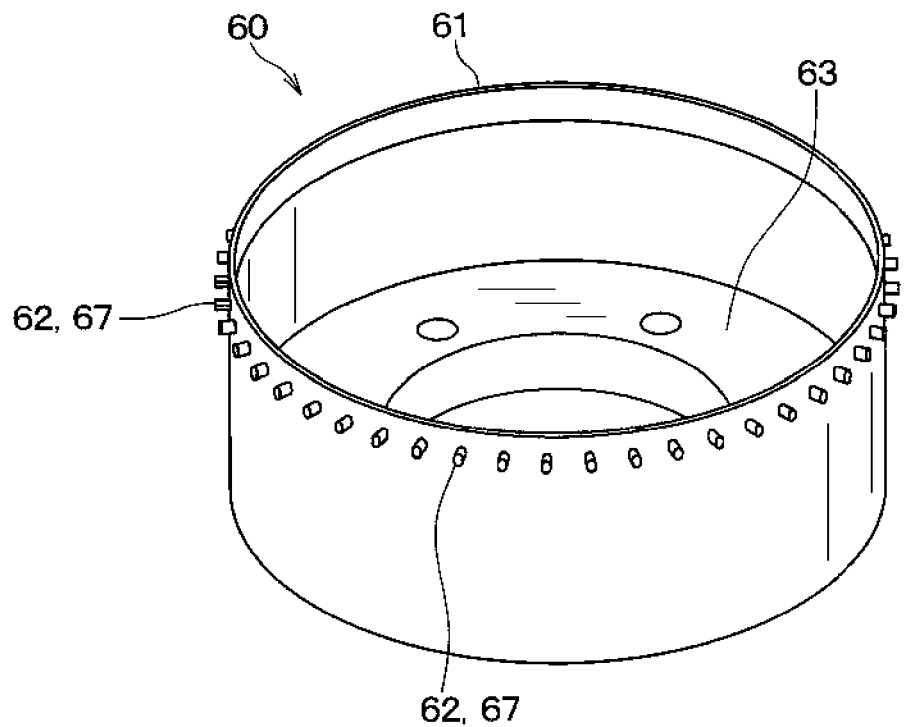
FIG. 14 is a perspective view of a processing jig of a manufacturing apparatus according to a second embodiment.

In contrast, in the second embodiment, as shown in FIG. 14, each of the processing jigs 60 has its protruding parts 62 formed as pins 67 that each radially protrude from a stator core-side end portion of the cylindrical part 61 and are arranged at predetermined intervals in the circumferential direction of the cylindrical part 61. Each of the circumferential intervals between the pins 67 is predetermined to be larger than the circumferential width of each of the coil protruding parts 21. Therefore, it is possible for each circumferentially-adjacent pair of the pins 67 to have a corresponding one of the coil protruding parts 21 inserted therebetween.

In addition, the processing jig 60 shown in FIG. 14 is configured to have all the pins 67 protruding radially outward from the cylindrical part 61. However, the processing jig 60 may alternatively be configured to have all the pins 67 protruding radially inward from the cylindrical part 61.

Next, the bending step S60 of the manufacturing method according to the second embodiment will be described with reference to FIGS. 15-18.

FIGS. 15-18 are schematic views along a radial direction of the stator core 10, showing only three circumferentially-adjacent coil protruding parts 21 among all the coil protruding parts 21 and part of one of the processing jigs 60 corresponding to the three coil protruding parts 21. In addition, in the present embodiment, in the bending step S60, each of the processing jigs 60 is moved relative to the stator core 10 by the operating unit 70 as in the first embodiment.

Figure 15:
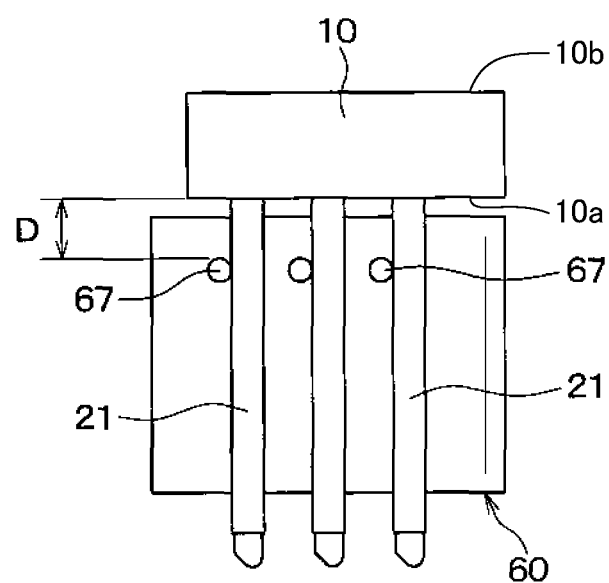
FIG. 15 is a first explanatory diagram illustrating a bending step of a manufacturing method according to the second embodiment.

In the bending step S60, each of the processing jigs 60 is axially moved toward the stator core 10, causing the first axial end face 10a of the stator core 10 and a stator core-side axial end of the processing jig 60 to become closer to each other. Consequently, as shown in FIG. 15, between each circumferentially-adjacent pair of the pins 67 of the processing jigs 60, there is inserted a corresponding one of the coil protruding parts 21. In this state, the pins 67 of the processing jigs 60 are located away from the first axial end face 10a of the stator core 10 by a predetermined distance D. The distance D is predetermined so as to allow the coil protruding parts 21 to be bent between the pins 67 of the processing jigs 60. Therefore, upon the first operation being performed by the operating unit 70 to rotate the processing jigs 60 in the circumferential direction of the stator core 10, each of the coil protruding parts 21 will be bent with the bending start point being located between the first axial end face 10a of the stator core 10 and the location where the coil protruding part 21 abuts a corresponding one of the pins 67 of the processing jigs 60. Consequently, with the above configuration of the processing jigs 60 according to the present embodiment, it also becomes possible to set the bending start point of each of the coil protruding parts 21 to be in the vicinity of the stator core 10.

Figure 16:
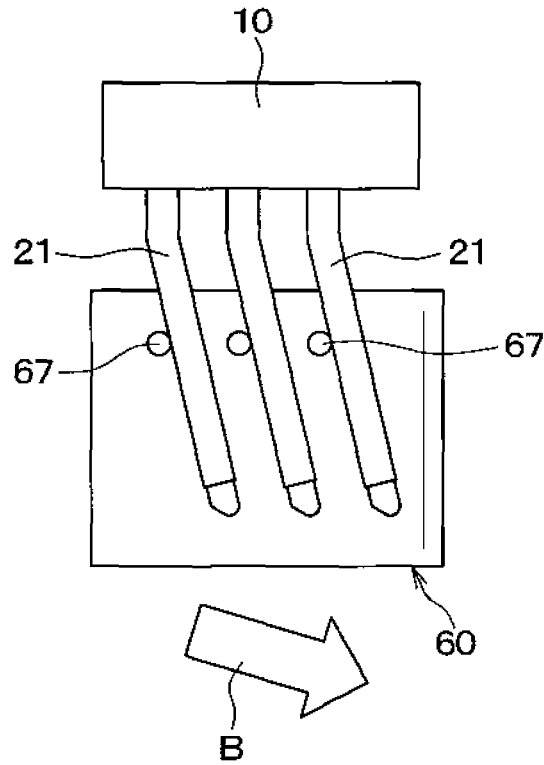
FIG. 16 is a second explanatory diagram illustrating the bending step of the manufacturing method according to the second embodiment.
Figure 17:
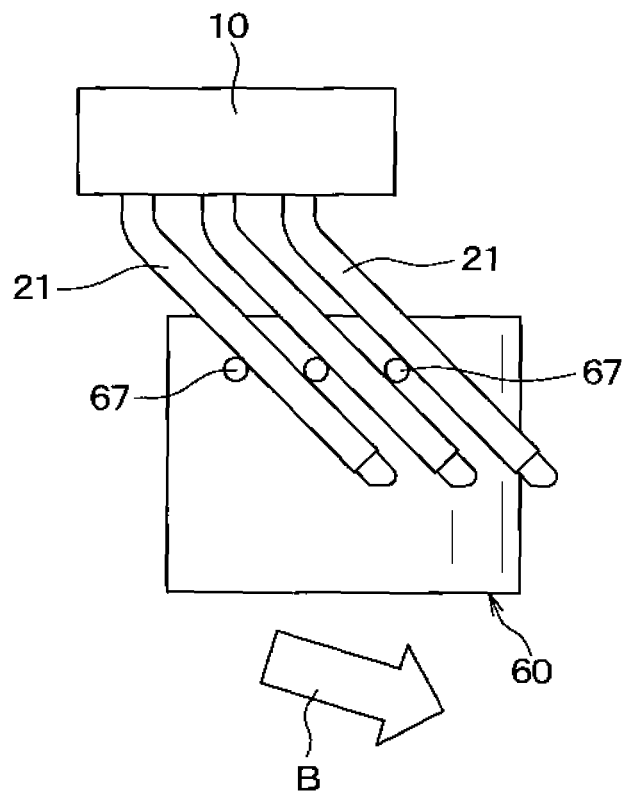
FIG. 17 is a third explanatory diagram illustrating the bending step of the manufacturing method according to the second embodiment.

Further, as shown in FIGS. 16 and 17, the operating unit 70 performs, either simultaneously or alternately, the first operation of rotating the processing jigs 60 in the circumferential direction of the stator core 10 and the second operation of axially moving the processing jigs 60 away from the stator core 10. More specifically, the operating unit 70 axially moves the processing jigs 60 away from the stator core 10 while rotating the processing jigs 60 in the circumferential direction of the stator core 10, causing each of the pins 67 to slide between one circumferentially-adjacent pair of the coil protruding parts 21. In addition, in FIGS. 16 and 17, the direction of movement of the processing jigs 60 relative to the stator core 10 during the first and second operations is indicated by an arrow B.

With the first and second operations performed by the operating unit 70, it becomes possible to bend the coil protruding parts 21 in the circumferential direction of the stator core 10 while controlling the radii of curvature of the coil protruding parts 21. Consequently, it becomes possible to suppress variation in the radii of curvature of the coil protruding parts 21.

Figure 18:
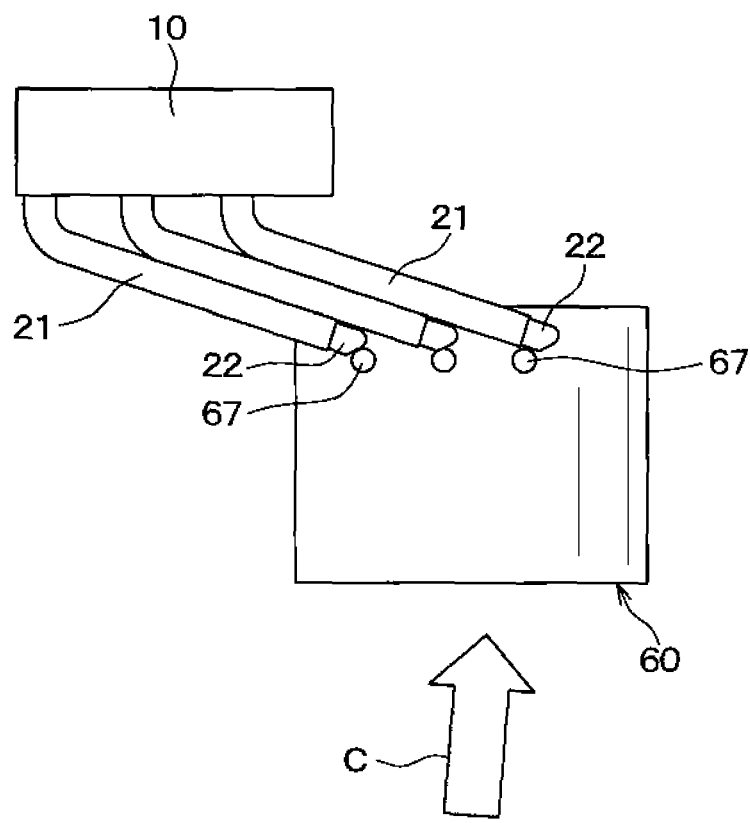
FIG. 18 is a fourth explanatory diagram illustrating the bending step of the manufacturing method according to the second embodiment.

Furthermore, as shown in FIG. 18, after performing the first and second operations until the pins 67 are withdrawn from the gaps between the circumferentially-adjacent coil protruding parts 21, the operating unit 70 further performs the third operation of axially moving the processing jigs 60 toward the stator core 10 with the pins 67 of the processing jigs 60 kept in contact with the distal end portions 22 of the corresponding coil protruding parts 21 or those portions of the corresponding coil protruding parts 21 which are immediately adjacent to the distal end portions 22. Consequently, the coil protruding parts 21 are pressed and thus bent toward the stator core 10 by the pins 67 of the processing jigs 60. As a result, the radii of curvature of the coil protruding parts 21 are further reduced, thereby further reducing the height of the coil end 25 of the stator coil. In addition, in FIG. 18, the direction of movement of the processing jigs 60 relative to the stator core 10 during the third operation is indicated by an arrow C.

According to the second embodiment, it is also possible to achieve the same advantageous effects as achievable according to the first embodiment.

Third Embodiment

Figure 19:
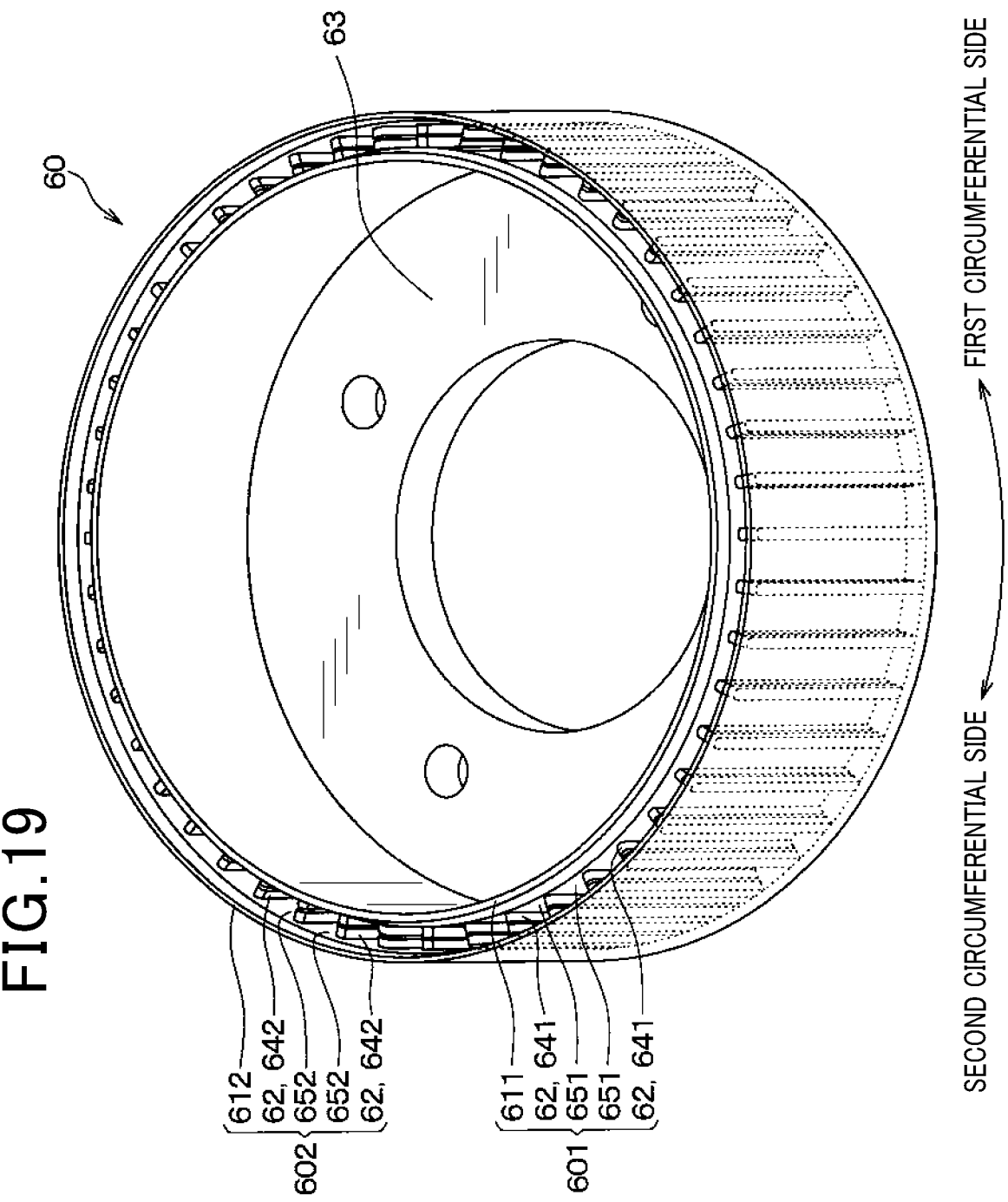
FIG. 19 is a perspective view of a processing jig of a manufacturing apparatus according to a third embodiment.
Figure 20:
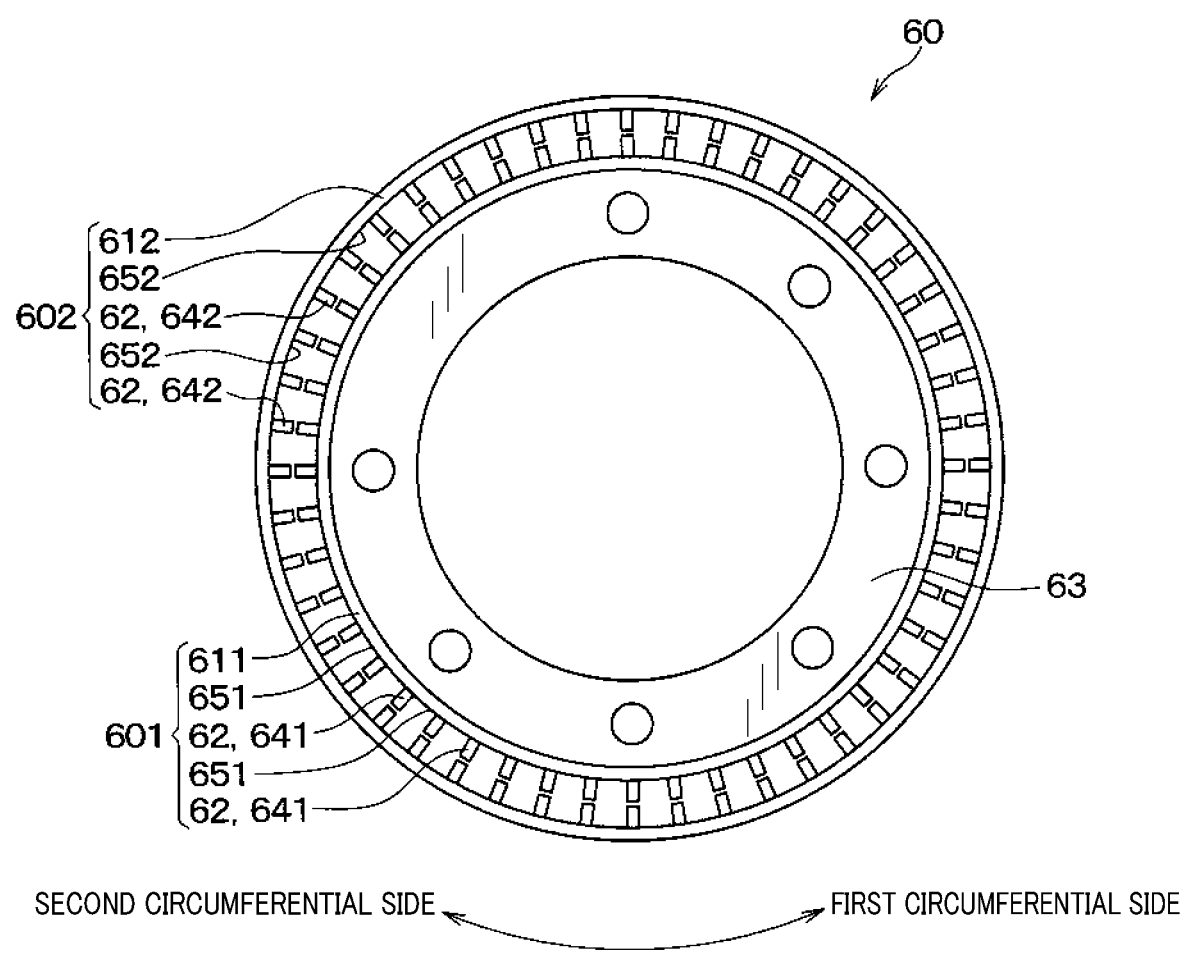
FIG. 20 is a plan view of the processing jig of the manufacturing apparatus according to the third embodiment.

FIGS. 19 and 20 together show the configuration of a processing jig 60 according to the third embodiment.

As shown in FIGS. 19 and 20, the processing jig 60 according to the third embodiment is composed of a pair of first and second processing jigs 601 and 602. The first and second processing jigs 601 and 602 are arranged coaxially with each other such that the second processing jig 602 is located radially outside the first processing jig 601.

In the third embodiment, each of the first and second processing jigs 601 and 602 is configured similarly to the processing jigs 60 in the first embodiment.

Specifically, the first processing jig 601 has a first cylindrical part 611 and a plurality of first axially-extending walls 641 (or protruding parts 62) each of which protrudes radially outward from the first cylindrical part 611 and extends in the axial direction of the first cylindrical part 611. Moreover, the first axially-extending walls 641 are arranged at predetermined intervals in the circumferential direction of the first cylindrical part 611 such that between each circumferentially-adjacent pair of the first axially-extending walls 641, there is formed a first groove 651. The circumferential width of each of the first grooves 651 formed between the first axially-extending walls 641 is set to be larger than the circumferential width of each of the coil protruding parts 21. Therefore, it is possible for each of the first grooves 651 to have a corresponding one of the coil protruding parts 21 inserted therein.

Similarly, the second processing jig 602 has a second cylindrical part 612 and a plurality of second axially-extending walls 642 (or protruding parts 62) each of which protrudes radially inward from the second cylindrical part 612 and extends in the axial direction of the second cylindrical part 612. Moreover, the second axially-extending walls 642 are arranged at predetermined intervals in the circumferential direction of the second cylindrical part 612 such that between each circumferentially-adjacent pair of the second axially-extending walls 642, there is formed a second groove 652. The circumferential width of each of the second grooves 652 formed between the second axially-extending walls 642 is set to be larger than the circumferential width of each of the coil protruding parts 21. Therefore, it is possible for each of the second grooves 652 to have a corresponding one of the coil protruding parts 21 inserted therein.

The second cylindrical part 612 of the second processing jig 602 is arranged coaxially with and radially outside the first cylindrical part 611 of the first processing jig 601. That is, the inner diameter of the second cylindrical part 612 is set to be larger than the outer diameter of the first cylindrical part 611. Moreover, before the bending step S60, radially inner end portions of the second axially-extending walls 642 of the second processing jig 602 are respectively located adjacent to and in radial alignment with radially outer end portions of the first axially-extending walls 641 of the first processing jig 601.

As described in the first embodiment, the coil protruding parts 21 are radially arranged in a plurality of layers (see FIG. 8). The plurality of layers include a radially adjacent pair of first and second layers; the second layer is located radially outside the first layer. In the third embodiment, in the bending step S60, the coil protruding parts 21 arranged at the first layer are inserted respectively into the first grooves 651 of the first processing jig 601 while the coil protruding parts 21 arranged at the second layer are inserted respectively into the second grooves 652 of the second processing jig 602. That is, the coil protruding parts 21 inserted in the first grooves 651 of the first processing jig 601 are respectively located adjacent to and radially inside the coil protruding parts 21 inserted in the second grooves 652 of the second processing jig 602.

Moreover, in the third embodiment, in the bending step S60, the operating unit 70 performs the first and second operations on both the coil protruding parts 21 inserted in the first grooves 651 and the coil protruding parts 21 inserted in the second grooves 652 at the same time. Specifically, the operating unit 70 performs the second operation of axially moving the first processing jig 601 away from the stator core 10 while performing the first operation of rotating the first processing jig 601 toward a first side in the circumferential direction of the stator core 10. At the same time, the operating unit 70 also performs the second operation of axially moving the second processing jig 602 away from the stator core 10 while performing the first operation of rotating the second processing jig 602 toward a second side opposite to the first side in the circumferential direction of the stator core 10 (see FIGS. 19 and 20). That is, in the first operation, the first and second processing jigs 601 and 602 are rotated by the operating unit 70 respectively in opposite directions. Consequently, the coil protruding parts 21 inserted in the first grooves 651 of the first processing jig 601 are bent toward the first side in the circumferential direction of the stator core 10 while the coil protruding parts 21 inserted in the second grooves 652 of the second processing jig 602 are bent toward the second side in the circumferential direction of the stator core 10.

As above, the processing jig 60 according to the present embodiment is composed of the pair of first and second processing jigs 601 and 602 having different diameters from and arranged coaxially with each other. Consequently, with the processing jig 60 according to the present embodiment, it becomes possible to bend both the coil protruding parts 21 arranged at the first layer and the coil protruding parts 21 arranged at the second layer at the same time. As a result, it becomes possible to reduce the time required to bend all the coil protruding parts 21 of the stator coil in the bending step S60.

In addition, according to the present embodiment, it is also possible to achieve the same advantageous effects as described in the first embodiment.

Fourth Embodiment

Figure 21:
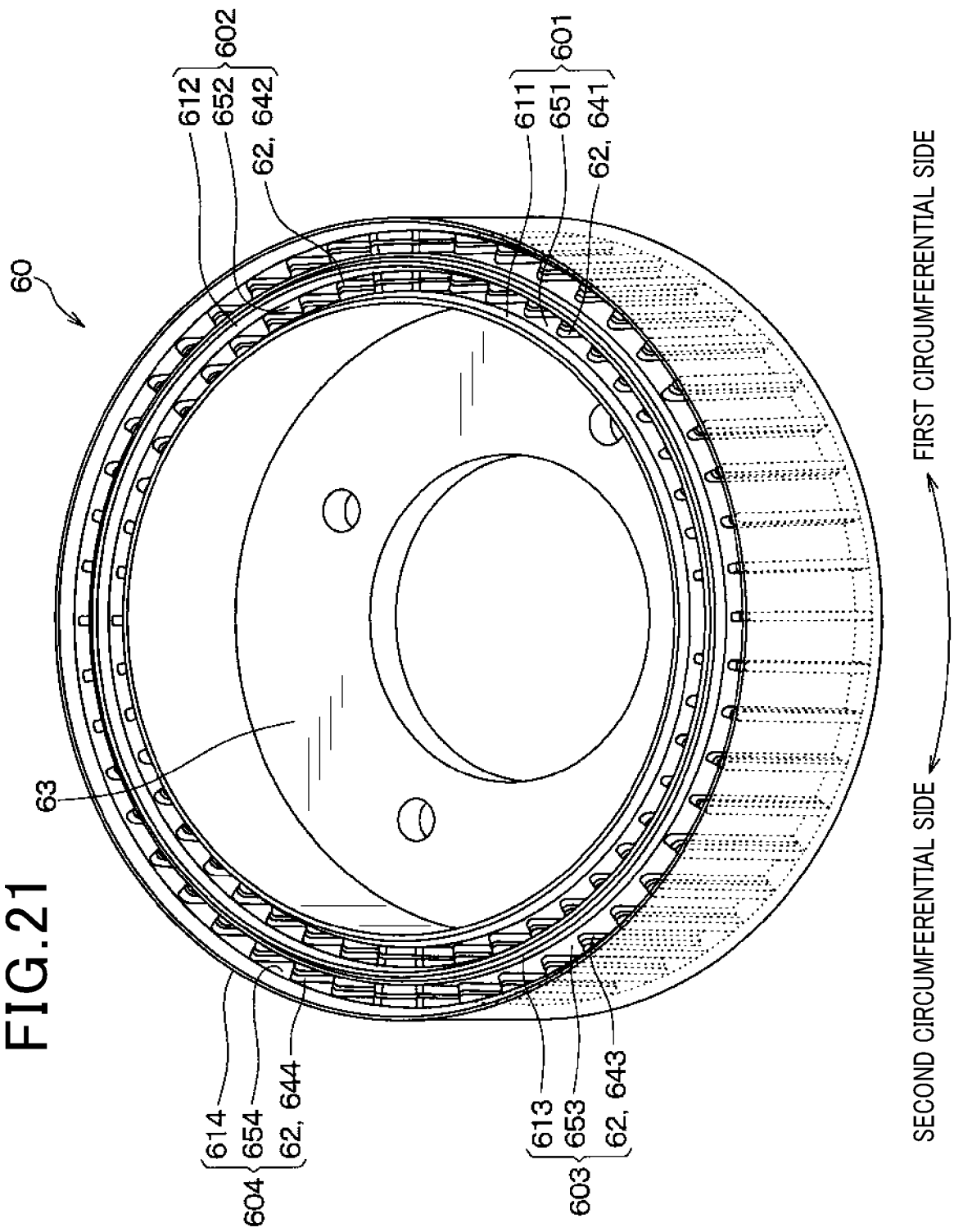
FIG. 21 is a perspective view of a processing jig of a manufacturing apparatus according to a fourth embodiment.
Figure 22:
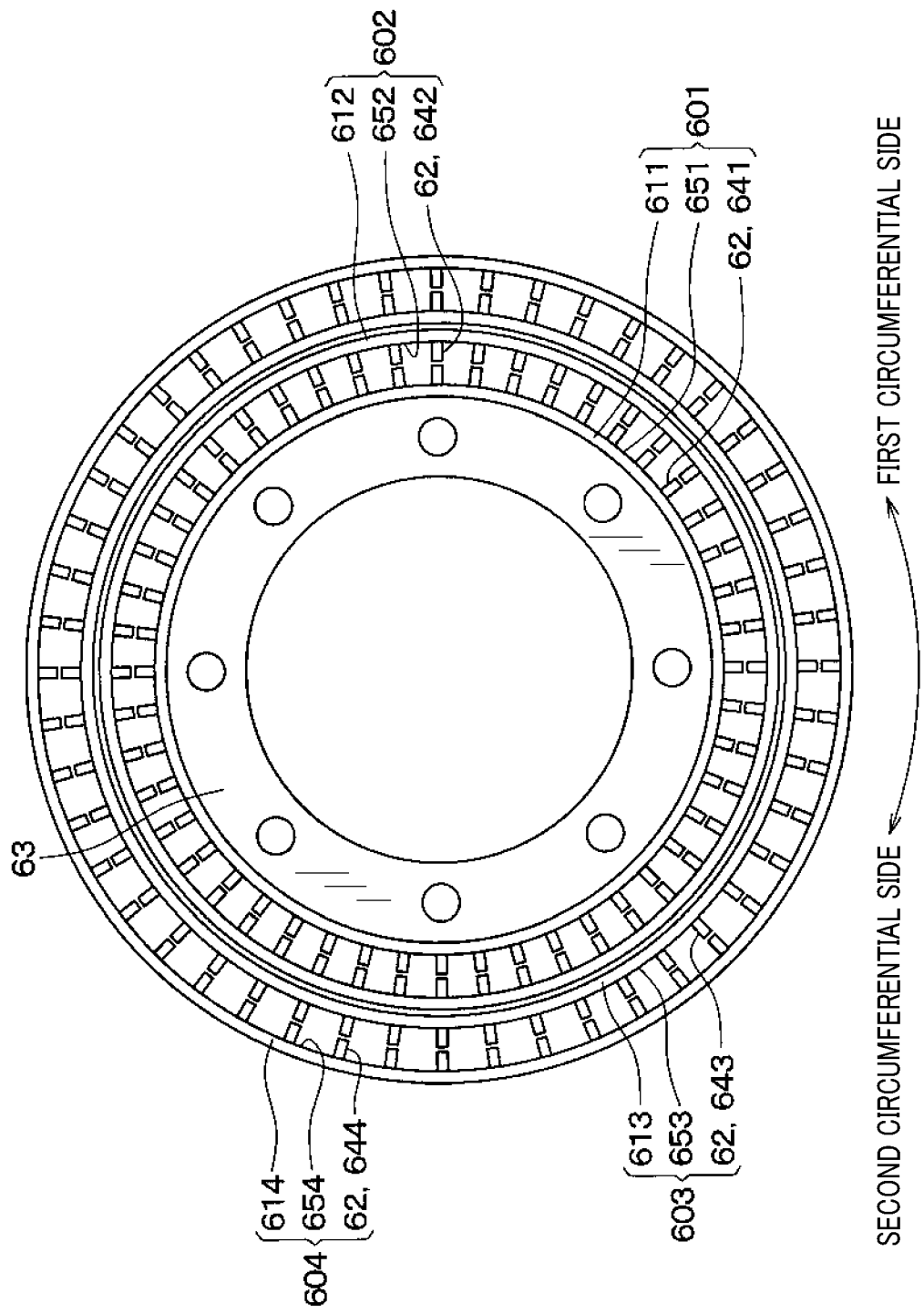
FIG. 22 is a plan view of the processing jig of the manufacturing apparatus according to the fourth embodiment.

FIGS. 21 and 22 together show the configuration of a processing jig 60 according to the fourth embodiment.

As shown in FIGS. 21 and 22, the processing jig 60 according to fourth embodiment is composed of two pairs of pressing jigs, i.e., a pair of first and second processing jigs 601 and 602 and a pair of third and fourth processing jigs 603 and 604. All of the first, second, third and fourth pressing jigs 601, 602, 603 and 604 are arranged coaxially with each other so as to be radially located in this order from the radially inner side. That is, the first pressing jig 601 is located radially innermost while the fourth pressing jig 604 is located radially outermost.

In the present embodiment, the first and second processing jigs 601 and 602 are identical to those in the third embodiment.

Moreover, in the present embodiment, the third and fourth processing jigs 603 and 604 are configured similarly to the first and second processing jigs 601 and 602.

Specifically, the third processing jig 603 has a third cylindrical part 613 and a plurality of third axially-extending walls 643 (or protruding parts 62) each of which protrudes radially outward from the third cylindrical part 613 and extends in the axial direction of the third cylindrical part 613. Moreover, the third axially-extending walls 643 are arranged at predetermined intervals in the circumferential direction of the third cylindrical part 613 such that between each circumferentially-adjacent pair of the third axially-extending walls 643, there is formed a third groove 653. The circumferential width of each of the third grooves 653 formed between the third axially-extending walls 643 is set to be larger than the circumferential width of each of the coil protruding parts 21. Therefore, it is possible for each of the third grooves 653 to have a corresponding one of the coil protruding parts 21 inserted therein.

In addition, the inner diameter of the third cylindrical part 613 is set to be larger than the outer diameter of the second cylindrical part 612; and the radially inner circumferential surface of the third cylindrical part 613 and the radially outer circumferential surface of the second cylindrical part 612 are arranged adjacent to each other.

Similarly, the fourth processing jig 604 has a fourth cylindrical part 614 and a plurality of fourth axially-extending walls 644 (or protruding parts 62) each of which protrudes radially inward from the fourth cylindrical part 614 and extends in the axial direction of the fourth cylindrical part 614. Moreover, the fourth axially-extending walls 644 are arranged at predetermined intervals in the circumferential direction of the fourth cylindrical part 614 such that between each circumferentially-adjacent pair of the fourth axially-extending walls 644, there is formed a fourth groove 654. The circumferential width of each of the fourth grooves 654 formed between the fourth axially-extending walls 644 is set to be larger than the circumferential width of each of the coil protruding parts 21. Therefore, it is possible for each of the fourth grooves 654 to have a corresponding one of the coil protruding parts 21 inserted therein.

The fourth cylindrical part 614 of the fourth processing jig 604 is arranged coaxially with and radially outside the third cylindrical part 613 of the third processing jig 603. That is, the inner diameter of the fourth cylindrical part 614 is set to be larger than the outer diameter of the third cylindrical part 613. Moreover, before the bending step S60, radially inner end portions of the fourth axially-extending walls 644 of the fourth processing jig 604 are respectively located adjacent to and in radial alignment with radially outer end portions of the third axially-extending walls 643 of the third processing jig 603.

As described in the first embodiment, the coil protruding parts 21 are radially arranged in a plurality of layers (see FIG. 8). The plurality of layers include first, second, third and fourth layers that are radially located in this order from the radially inner side. In the fourth embodiment, in the bending step S60, the coil protruding parts 21 arranged at the first layer are inserted respectively into the first grooves 651 of the first processing jig 601; the coil protruding parts 21 arranged at the second layer are inserted respectively into the second grooves 652 of the second processing jig 602; the coil protruding parts 21 arranged at the third layer are inserted respectively into the third grooves 653 of the third processing jig 603; and the coil protruding parts 21 arranged at the fourth layer are inserted respectively into the fourth grooves 654 of the fourth processing jig 604. That is, each of the coil protruding parts 21 inserted in the first grooves 651 of the first processing jig 601 is radially aligned with a corresponding one of the coil protruding parts 21 inserted in the second grooves 652 of the second processing jig 602, a corresponding one of the coil protruding parts 21 inserted in the third grooves 653 of the third processing jig 603, and a corresponding one of the coil protruding parts 21 inserted in the fourth grooves 654 of the fourth processing jig 604.

Moreover, in the fourth embodiment, in the bending step S60, the operating unit 70 performs the first and second operations on the coil protruding parts 21 inserted in the first grooves 651 and the coil protruding parts 21 inserted in the second grooves 652 in the same manner as described in the third embodiment. Furthermore, the operating unit 70 performs the first and second operations also on the coil protruding parts 21 inserted in the third grooves 653 and the coil protruding parts 21 inserted in the fourth grooves 654 at the same time and in the same manner as the coil protruding parts 21 inserted in the first grooves 651 and the coil protruding parts 21 inserted in the second grooves 652. Specifically, the operating unit 70 performs the second operation of axially moving the third processing jig 603 away from the stator core 10 while performing the first operation of rotating third processing jig 603 toward the first side in the circumferential direction of the stator core 10. At the same time, the operating unit 70 also performs the second operation of axially moving the fourth processing jig 604 away from the stator core 10 while performing the first operation of rotating the fourth processing jig 604 toward the second side opposite to the first side in the circumferential direction of the stator core 10 (see FIGS. 21 and 22). That is, in the first operation, the first and second processing jigs 601 and 602 are rotated by the operating unit 70 respectively in opposite directions; the second and third processing jigs 602 and 603 are rotated by the operating unit 70 respectively in opposite directions; and the third and fourth processing jigs 603 and 604 are rotated by the operating unit 70 respectively in opposite directions. In other words, each radially-adjacent pair of the first, second, third and fourth processing jigs 601, 602, 603 and 604 are rotated by the operating unit 70 respectively in opposite directions. Consequently, both the coil protruding parts 21 inserted in the first grooves 651 of the first processing jig 601 and the coil protruding parts 21 inserted in the third grooves 653 of the third processing jig 603 are bent toward the first side in the circumferential direction of the stator core 10 while both the coil protruding parts 21 inserted in the second grooves 652 of the second processing jig 602 and the coil protruding parts 21 inserted in the fourth grooves 654 of the fourth processing jig 604 are bent toward the second side in the circumferential direction of the stator core 10.

As above, the processing jig 60 according to the present embodiment is composed of the first to the fourth processing jigs 601-604 having different diameters from and arranged coaxially with each other. Consequently, with the processing jig 60 according to the present embodiment, it becomes possible to bend the coil protruding parts 21 arranged at the first to the fourth layers at the same time. As a result, it becomes possible to further reduce the time required to bend all the coil protruding parts 21 of the stator coil in the bending step S60.

In addition, according to the present embodiment, it is also possible to achieve the same advantageous effects as described in the first embodiment.

Fifth Embodiment

Figure 23:
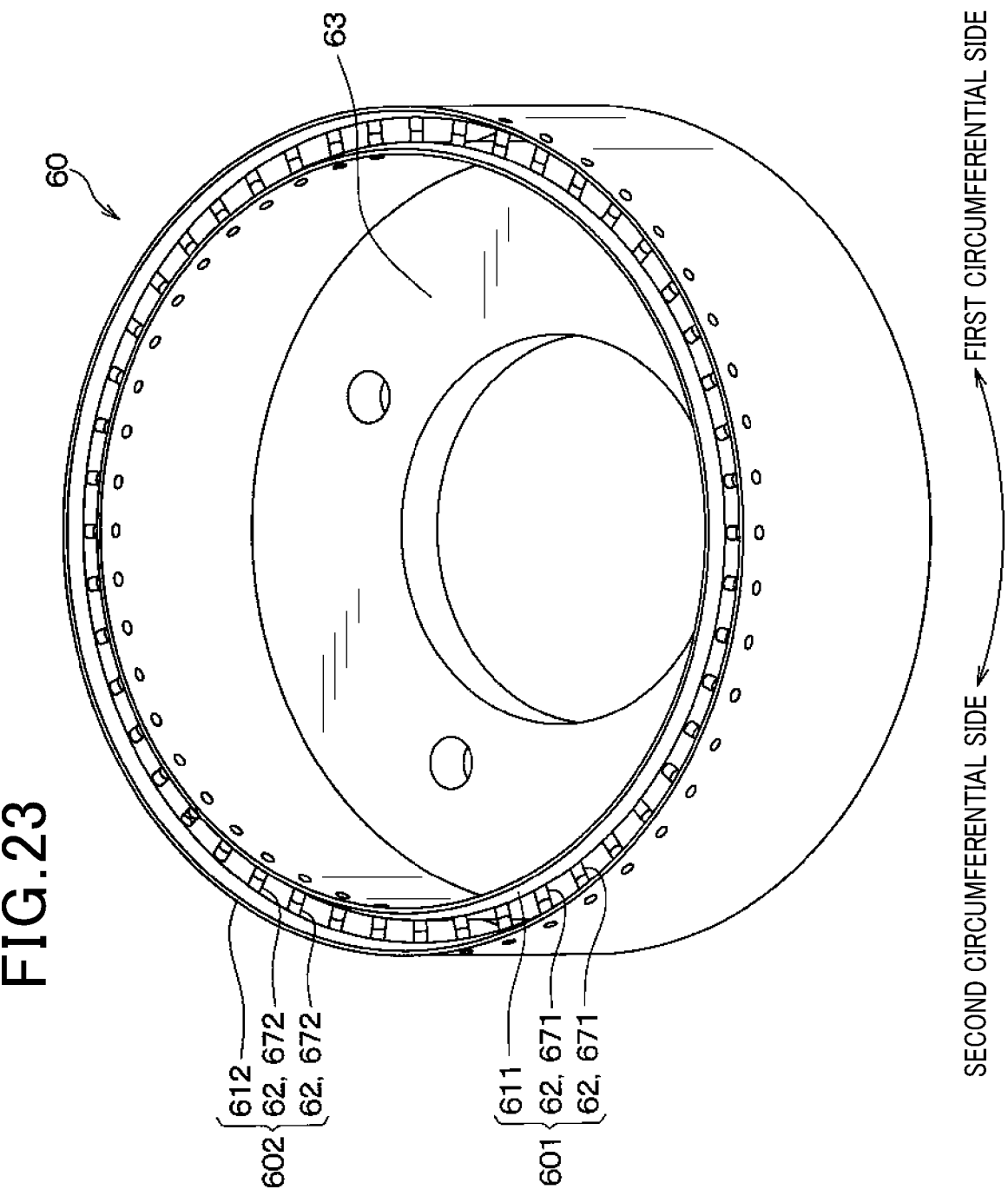
FIG. 23 is a perspective view of a processing jig of a manufacturing apparatus according to a fifth embodiment.

FIG. 23 shows the configuration of a processing jig 60 according to the fifth embodiment.

As shown in FIG. 23, the processing jig 60 according to the fifth embodiment is composed of a pair of first and second processing jigs 601 and 602. The first and second processing jigs 601 and 602 are arranged coaxially with each other such that the second processing jig 602 is located radially outside the first processing jig 601.

In the fifth embodiment, each of the first and second processing jigs 601 and 602 is configured similarly to the processing jigs 60 in the second embodiment.

Specifically, the first processing jig 601 has a first cylindrical part 611 and a plurality of first pins 671 (or protruding parts 62) that each protrude radially outward from the first cylindrical part 611 and are arranged at predetermined intervals in the circumferential direction of the first cylindrical part 611. Each of the circumferential intervals between the first pins 671 is predetermined to be larger than the circumferential width of each of the coil protruding parts 21. Therefore, it is possible for each circumferentially-adjacent pair of the first pins 671 to have a corresponding one of the coil protruding parts 21 inserted therebetween.

Similarly, the second processing jig 602 has a second cylindrical part 612 and a plurality of second pins 672 (or protruding parts 62) that each protrude radially inward from the second cylindrical part 612 and are arranged at predetermined intervals in the circumferential direction of the second cylindrical part 612. Each of the circumferential intervals between the second pins 672 is predetermined to be larger than the circumferential width of each of the coil protruding parts 21. Therefore, it is possible for each circumferentially-adjacent pair of the second pins 672 to have a corresponding one of the coil protruding parts 21 inserted therebetween.

The second cylindrical part 612 of the second processing jig 602 is arranged coaxially with and radially outside the first cylindrical part 611 of the first processing jig 601. That is, the inner diameter of the second cylindrical part 612 is set to be larger than the outer diameter of the first cylindrical part 611. Moreover, before the bending step S60, radially inner end portions of the second pins 672 of the second processing jig 602 are respectively located adjacent to and in radial alignment with radially outer end portions of the first pins 671 of the first processing jig 601.

As described in the first embodiment, the coil protruding parts 21 are radially arranged in a plurality of layers (see FIG. 8). The plurality of layers include a radially adjacent pair of first and second layers; the second layer is located radially outside the first layer. In the fifth embodiment, in the bending step S60, the coil protruding parts 21 arranged at the first layer are inserted between the first pins 671 of the first processing jig 601 while the coil protruding parts 21 arranged at the second layer are inserted between the second pins 672 of the second processing jig 602. That is, the coil protruding parts 21 inserted between the first pins 671 of the first processing jig 601 are respectively located adjacent to and radially inside the coil protruding parts 21 inserted between the second pins 672 of the second processing jig 602.

Moreover, in the fifth embodiment, in the bending step S60, the operating unit 70 performs the first and second operations on both the coil protruding parts 21 inserted between the first pins 671 of the first processing jig 601 and the coil protruding parts 21 inserted between the second pins 672 of the second processing jig 602 at the same time. Specifically, the operating unit 70 performs the second operation of axially moving the first processing jig 601 away from the stator core 10 while performing the first operation of rotating the first processing jig 601 toward a first side in the circumferential direction of the stator core 10. At the same time, the operating unit 70 also performs the second operation of axially moving the second processing jig 602 away from the stator core 10 while performing the first operation of rotating the second processing jig 602 toward a second side opposite to the first side in the circumferential direction of the stator core 10 (see FIG. 23). That is, in the first operation, the first and second processing jigs 601 and 602 are rotated by the operating unit 70 respectively in opposite directions. Consequently, the coil protruding parts 21 inserted between the first pins 671 of the first processing jig 601 are bent toward the first side in the circumferential direction of the stator core 10 while the coil protruding parts 21 inserted between the second pins 672 of the second processing jig 602 are bent toward the second side in the circumferential direction of the stator core 10.

As above, the processing jig 60 according to the present embodiment is composed of the pair of first and second processing jigs 601 and 602 having different diameters from and arranged coaxially with each other. Consequently, with the processing jig 60 according to the present embodiment, it becomes possible to bend both the coil protruding parts 21 arranged at the first layer and the coil protruding parts 21 arranged at the second layer at the same time. As a result, it becomes possible to reduce the time required to bend all the coil protruding parts 21 of the stator coil in the bending step S60.

In addition, according to the present embodiment, it is also possible to achieve the same advantageous effects as described in the first embodiment.

Sixth Embodiment

Figure 24:
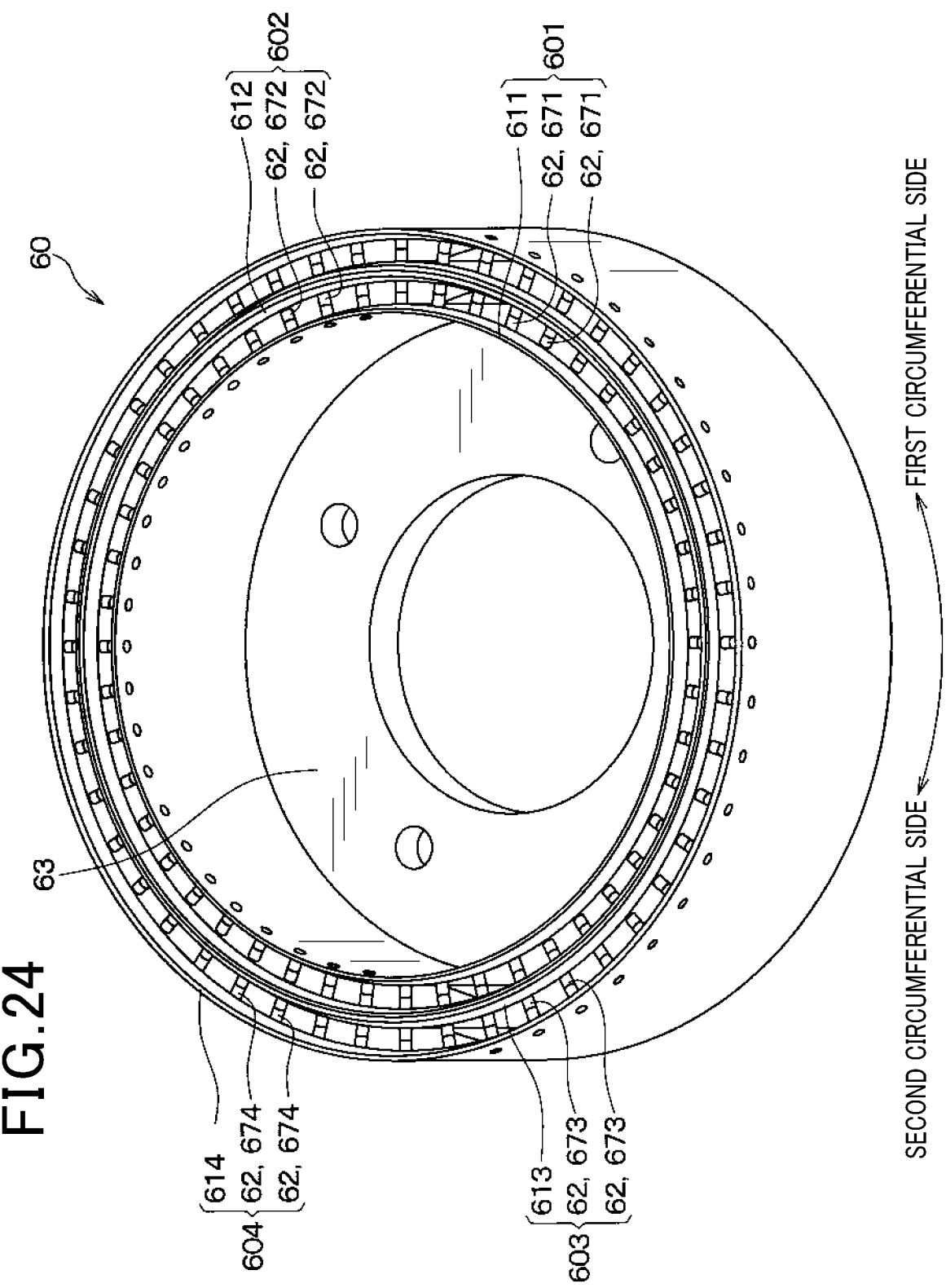
FIG. 24 is a perspective view of a processing jig of a manufacturing apparatus according to a sixth embodiment.

FIG. 24 shows the configuration of a processing jig 60 according to the sixth embodiment.

As shown in FIG. 24, the processing jig 60 according to sixth embodiment is composed of two pairs of pressing jigs, i.e., a pair of first and second processing jigs 601 and 602 and a pair of third and fourth processing jigs 603 and 604. All of the first, second, third and fourth pressing jigs 601, 602, 603 and 604 are arranged coaxially with each other so as to be radially located in this order from the radially inner side. That is, the first pressing jig 601 is located radially innermost while the fourth pressing jig 604 is located radially outermost.

In the present embodiment, the first and second processing jigs 601 and 602 are identical to those in the fifth embodiment.

Moreover, in the present embodiment, the third and fourth processing jigs 603 and 604 are configured similarly to the first and second processing jigs 601 and 602.

Specifically, the third processing jig 603 has a third cylindrical part 613 and a plurality of third pins 673 (or protruding parts 62) that each protrude radially outward from the third cylindrical part 613 and are arranged at predetermined intervals in the circumferential direction of the third cylindrical part 613. Each of the circumferential intervals between the third pins 673 is predetermined to be larger than the circumferential width of each of the coil protruding parts 21. Therefore, it is possible for each circumferentially-adjacent pair of the third pins 673 to have a corresponding one of the coil protruding parts 21 inserted therebetween.

In addition, the inner diameter of the third cylindrical part 613 is set to be larger than the outer diameter of the second cylindrical part 612; and the radially inner circumferential surface of the third cylindrical part 613 and the radially outer circumferential surface of the second cylindrical part 612 are arranged adjacent to each other.

Similarly, the fourth processing jig 604 has a fourth cylindrical part 614 and a plurality of fourth pins 674 (or protruding parts 62) that each protrude radially inward from the fourth cylindrical part 614 and are arranged at predetermined intervals in the circumferential direction of the fourth cylindrical part 614. Each of the circumferential intervals between the fourth pins 674 is predetermined to be larger than the circumferential width of each of the coil protruding parts 21. Therefore, it is possible for each circumferentially-adjacent pair of the fourth pins 674 to have a corresponding one of the coil protruding parts 21 inserted therebetween.

The fourth cylindrical part 614 of the fourth processing jig 604 is arranged coaxially with and radially outside the third cylindrical part 613 of the third processing jig 603. That is, the inner diameter of the fourth cylindrical part 614 is set to be larger than the outer diameter of the third cylindrical part 613. Moreover, before the bending step S60, radially inner end portions of the fourth pins 674 of the fourth processing jig 604 are respectively located adjacent to and in radial alignment with radially outer end portions of the third pins 673 of the third processing jig 603.

As described in the first embodiment, the coil protruding parts 21 are radially arranged in a plurality of layers (see FIG. 8). The plurality of layers include first, second, third and fourth layers that are radially located in this order from the radially inner side. In the sixth embodiment, in the bending step S60, the coil protruding parts 21 arranged at the first layer are inserted between the first pins 671 of the first processing jig 601; the coil protruding parts 21 arranged at the second layer are inserted between the second pins 672 of the second processing jig 602; the coil protruding parts 21 arranged at the third layer are inserted between the third pins 673 of the third processing jig 603; and the coil protruding parts 21 arranged at the fourth layer are inserted between the fourth pins 674 of the fourth processing jig 604. That is, each of the coil protruding parts 21 inserted between the first pins 671 of the first processing jig 601 is radially aligned with a corresponding one of the coil protruding parts 21 inserted between the second pins 672 of the second processing jig 602, a corresponding one of the coil protruding parts 21 inserted between the third pins 673 of the third processing jig 603, and a corresponding one of the coil protruding parts 21 inserted between the fourth pins 674 of the fourth processing jig 604.

Moreover, in the sixth embodiment, in the bending step S60, the operating unit 70 performs the first and second operations on the coil protruding parts 21 inserted between the first pins 671 of the first processing jig 601 and the coil protruding parts 21 inserted between the second pins 672 of the second processing jig 602 in the same manner as described in the fifth embodiment. Furthermore, the operating unit 70 performs the first and second operations also on the coil protruding parts 21 inserted between the third pins 673 of the third processing jig 603 and the coil protruding parts 21 inserted between the fourth pins 674 of the fourth processing jig 604 at the same time and in the same manner as the coil protruding parts 21 inserted between the first pins 671 and the coil protruding parts 21 inserted between the second pins 672. Specifically, the operating unit 70 performs the second operation of axially moving the third processing jig 603 away from the stator core 10 while performing the first operation of rotating third processing jig 603 toward the first side in the circumferential direction of the stator core 10. At the same time, the operating unit 70 also performs the second operation of axially moving the fourth processing jig 604 away from the stator core 10 while performing the first operation of rotating the fourth processing jig 604 toward the second side opposite to the first side in the circumferential direction of the stator core 10 (see FIG. 24). That is, in the first operation, the first and second processing jigs 601 and 602 are rotated by the operating unit 70 respectively in opposite directions; the second and third processing jigs 602 and 603 are rotated by the operating unit 70 respectively in opposite directions; and the third and fourth processing jigs 603 and 604 are rotated by the operating unit 70 respectively in opposite directions. In other words, each radially-adjacent pair of the first, second, third and fourth processing jigs 601, 602, 603 and 604 are rotated by the operating unit 70 respectively in opposite directions. Consequently, both the coil protruding parts 21 inserted between the first pins 671 of the first processing jig 601 and the coil protruding parts 21 inserted between the third pins 673 of the third processing jig 603 are bent toward the first side in the circumferential direction of the stator core 10 while both the coil protruding parts 21 inserted between the second pins 672 of the second processing jig 602 and the coil protruding parts 21 inserted between the fourth pins 674 of the fourth processing jig 604 are bent toward the second side in the circumferential direction of the stator core 10.

As above, the processing jig 60 according to the present embodiment is composed of the first to the fourth processing jigs 601-604 having different diameters from and arranged coaxially with each other. Consequently, with the processing jig 60 according to the present embodiment, it becomes possible to bend the coil protruding parts 21 arranged at the first to the fourth layers at the same time. As a result, it becomes possible to further reduce the time required to bend all the coil protruding parts 21 of the stator coil in the bending step S60.

In addition, according to the present embodiment, it is also possible to achieve the same advantageous effects as described in the first embodiment.

While the above particular embodiments have been shown and described, it will be understood by those skilled in the art that various modifications, changes and improvements may be made without departing from the spirit of the present disclosure.

For example, in the above-described embodiments, as the first operation, the operating unit 70 rotates the processing jigs 60 in the circumferential direction of the stator core 10 while keeping the stator core 10 stationary. As an alternative, the operating unit 70 may rotate the stator core 10 in the circumferential direction thereof while keeping the processing jigs 60 stationary. As another alternative, the operating unit 70 may rotate both the stator core 10 and the processing jigs 60 at different speeds and/or in opposite directions in the circumferential direction of the stator core 10. That is, as the first operation, it is necessary for the operating unit 70 to relatively rotate the stator core 10 and the processing jigs 60 in the circumferential direction of the stator core 10.

In the above-described embodiments, as the second operation, the operating unit 70 moves the processing jigs 60 away from the stator core 10 in the axial direction of the stator core 10 while keeping the stator core 10 stationary. As an alternative, the operating unit 70 may move the stator core 10 away from the processing jigs 10 in the axial direction of the stator core 10 while keeping the processing jigs 60 stationary. As another alternative, the operating unit 70 may move both the stator core 10 and the processing jigs 60 away from each other in the axial direction of the stator core 10. That is, as the second operation, it is necessary for the operating unit 70 to relatively move the stator core 10 and the processing jigs 60 away from each other in the axial direction of the stator core 10.

In the above-described embodiments, as the third operation, the operating unit 70 moves the processing jigs 60 toward the stator core 10 in the axial direction of the stator core 10 while keeping the stator core 10 stationary. As an alternative, the operating unit 70 may move the stator core 10 toward the processing jigs 10 in the axial direction of the stator core 10 while keeping the processing jigs 60 stationary. As another alternative, the operating unit 70 may move both the stator core 10 and the processing jigs 60 toward each other in the axial direction of the stator core 10. That is, as the third operation, it is necessary for the operating unit 70 to relatively move the stator core 10 and the processing jigs 60 toward each other in the axial direction of the stator core 10.

In the above-described embodiments, no insulation cuffs are provided at axial ends of the stator core 10. Alternatively, insulation cuffs may be provided at the axial ends of the stator core 10.

In the above-described embodiments, the coil segments 20 are formed of an electric wire having a substantially rectangular cross-sectional shape. However, the coil segments 20 may alternatively be formed of an electric wire having other cross-sectional shapes, such as a circular cross-sectional shape, an elliptical cross-sectional shape, a polygonal cross-sectional shape or any combination of the aforementioned cross-sectional shapes.

In the above-described embodiments, the insulators 30 are formed of a curable and foamable resin that is foamed and cured upon being heated. However, the insulators 30 may alternatively be formed of other materials. Moreover, in this case, it is preferable to impregnate varnish into the slots 11 of the stator core 10, thereby fixing the coil segments 20 and the insulators 30 in the slots 11.

What is claimed is:

1. A method of manufacturing a stator for a rotating electric machine,
the stator comprising an annular stator core having a plurality of slots formed therein and a stator coil formed of a plurality of coil segments inserted in the slots of the stator core, the stator coil having a plurality of coil protruding parts which are parts of the coil segments protruding outside the slots from an axial end face of the stator core,
the method comprising steps of:
supporting, by a supporting member, the stator core with the coil segments inserted in the slots of the stator core such that the coil protruding parts protrude in an axial direction of the stator core from the axial end face thereof;
arranging at least one processing jig coaxially with the stator core, the at least one processing jig having a cylindrical part and a plurality of protruding parts each radially protruding from the cylindrical part and arranged at predetermined intervals in a circumferential direction of the cylindrical part;
relatively moving the stator core and the at least one processing jig toward each other in the axial direction of the stator core to have: the cylindrical part of the at least one processing jig located radially outside or radially inside the coil protruding parts; each of the coil protruding parts inserted between one circumferentially-adjacent pair of the protruding parts of the at least one processing jig; and the axial end face of the stator core located away from the protruding parts of the at least one processing jig in the axial direction of the stator core by a predetermined distance;
performing, by an operating unit, a first operation and a second operation either simultaneously or alternately, the first operation being an operation of relatively rotating the stator core and the at least one processing jig in a circumferential direction of the stator core, the second operation being an operation of relatively moving the stator core and the at least one processing jig away from each other in the axial direction of the stator core; and performing, by the operating unit, a third operation after the step of performing the first and second operations, the third operation being an operation of relatively moving the stator core and the at least one processing jig toward each other in the axial direction of the stator core with each of the protruding parts of the at least one processing jig kept in contact with a distal end portion of a corresponding one of the coil protruding parts or a portion of the corresponding coil protruding part which is immediately adjacent to the distal end portion.

* * * * *